United States Patent
Comstock, II et al.

(10) Patent No.: US 9,383,486 B2
(45) Date of Patent: Jul. 5, 2016

(54) FILMS FOR DISPLAY COVERS AND DISPLAY DEVICES COMPRISING THE SAME

(71) Applicant: Corning Incorporated, Corning, NY (US)

(72) Inventors: Lovell Elgin Comstock, II, Charlestown, NH (US); Jacques Gollier, Painted Post, NY (US); Abbas Mehdi Kazmi, Horseheads, NY (US); Ying Zhang, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 14/069,854

(22) Filed: Nov. 1, 2013

(65) Prior Publication Data
US 2014/0126075 A1    May 8, 2014

Related U.S. Application Data

(60) Provisional application No. 61/723,588, filed on Nov. 7, 2012.

(51) Int. Cl.
*G02B 27/10*    (2006.01)
*G02B 5/04*     (2006.01)
*G06F 1/16*     (2006.01)

(52) U.S. Cl.
CPC ............ *G02B 5/045* (2013.01); *G06F 1/1601* (2013.01)

(58) Field of Classification Search
CPC ...... G02B 5/021; G02B 5/045; G02B 6/0051; G02B 6/0053; G02F 2001/133607; G02F 1/133504; G02F 1/133611; G02F 2202/022
USPC ............ 359/463, 485.06, 619, 625, 707, 831
See application file for complete search history.

(56) References Cited

U.S. PATENT DOCUMENTS

| | | | |
|---|---|---|---|
| 2003/0095332 A1* | 5/2003 | Gardner et al. | 359/599 |
| 2009/0103191 A1 | 4/2009 | Xun et al. | 359/742 |
| 2010/0232026 A1 | 9/2010 | Park et al. | 359/625 |
| 2011/0164318 A1* | 7/2011 | Yun et al. | 359/463 |
| 2011/0262092 A1* | 10/2011 | Large | 385/129 |
| 2013/0271957 A1* | 10/2013 | Etienne et al. | 362/97.1 |
| 2014/0118226 A1* | 5/2014 | Gollier | 345/32 |

FOREIGN PATENT DOCUMENTS

WO    2006099375 A1    9/2006

OTHER PUBLICATIONS

Jul. 7, 2014—Notification of Transmittal of the International Search Report and the Written Opinion of the International Searching Authority, or the Declaration.

\* cited by examiner

*Primary Examiner* — Mahidere Sahle
(74) *Attorney, Agent, or Firm* — Kevin M. Able

(57) ABSTRACT

Films for display device covers and display device covers comprising the same are disclosed. In one embodiment, a display cover for coupling to a display device includes a perimeter portion comprising a first surface and a second surface. A film of polymeric material may be attached to at least one of the first surface or the second surface of the perimeter portion. The film may include a first array of prisms extending from an edge of the perimeter portion to a distance L. The first array of prisms may be offset from and positioned below a surface of the film by an offset spacing dz.

20 Claims, 29 Drawing Sheets

Prism angle decreases →

.2mm

FILMS FOR DISPLAY COVERS AND DISPLAY DEVICES COMPRISING THE SAME

This application claims the benefit of priority under 35 U.S.C. §119(e) of U.S. Provisional Application No. 61/723,588, filed on Nov. 7, 2012, the content of which is incorporated herein in its entirety by reference.

TECHNICAL FIELD

The present disclosure relates to films for display covers for display devices, such as televisions, and display devices comprising the same.

BACKGROUND

As used herein, the term display device is intended to encompass all devices capable of displaying visual content, including, but not limited to, computers, including laptops, notebooks, tablets and desktops; mobile telephones, and; televisions (TV). Each of the foregoing devices include many component parts, including the physical case or cabinet in which individual components may reside, circuit boards, circuit elements such as integrated electronic components, and of course the display panel itself. Currently, these display panels are flat display panels comprising liquid crystal display elements, organic light emitting diode (OLED) display elements, or plasma display elements, and of course the glass or plastic substrates on which many of these elements are disposed and/or enclosed by. Typically, the edge portions of the flat display panels and the display device itself are utilized for electrical leads and various other electronic components associated with the operation of the display panel, such as circuits that drive the panel pixels as well as LED illuminators in the case of a LCD display panel. This has resulted in flat display panel manufacturers encasing the edge portions within and/or behind a bezel, which serves to conceal the foregoing components, but also obscures the edge portions of the display panel thereby reducing the overall image size.

For aesthetic reasons, flat panel display makers are trying to maximize the image viewing area and provide a more aesthetically pleasing appearance, and accordingly minimize the size of the bezel surrounding the image. However, there are practical limits to this minimization, and current bezel sizes are on the order of 3 mm to 10 mm in width. Therefore, to achieve the ultimate goal of no bezel at all, an optical solution has been proposed that will give the observer the impression that the image is occupying the entire panel surface while simultaneously reducing a gap between the image-forming display panel and a display cover.

SUMMARY

According to one embodiment, a display cover for coupling to a display device includes a perimeter portion comprising a first surface and a second surface. A film of polymeric material may be attached to at least one of the first surface or the second surface of the perimeter portion. The film may comprise a first array of prisms extending from an edge of the perimeter portion to a distance L. The first array of prisms may be offset from and positioned below a surface of the film by an offset spacing dz.

In another embodiment, a film of polymeric material may include a first array of prisms offset from and positioned below a surface of the film by at least one step feature. The first array of prisms may be offset from the surface by an offset spacing dz. In some embodiments, the offset spacing dz is equal to $(k*\lambda/(n-1))\pm 2$ µm, where $\lambda$ is a median wavelength of light transmitted through the film, k is an integer greater than or equal to 1, and n is an index of refraction of the film.

According to another embodiment, a film of polymeric material may include a first array of prisms offset from and positioned below a surface of the film by an offset spacing dz. The first array of prisms may be offset from and positioned below a surface of the film by a graded portion that is oriented at an angle $\phi$ with respect to the surface such that the surface transitions into the array of prisms over a distance. In some embodiments, the angle $\phi$ is such that light passing through the graded portion of the film is offset by an amount dx which is less than 1/10 of a pixel size of a display device to which the film is attached. In some other embodiments, the angle $\phi$ is such that light passing through the graded portion of the film is offset by an amount dx which is equal to one pixel size of a display device to which the film is attached.

According to yet another embodiment, a film of polymeric material may include at least one edge having a saw tooth pattern formed therein. Edges of the saw tooth pattern may have a tooth angle $\beta$ which is equal to arctan (SDP), where SDP is a sub-duty pixel factor of a display device to which the film of polymeric material is attached. The film may be aligned on a display cover such that an edge of each tooth of the saw tooth pattern is parallel with a diagonal of at least one corresponding pixel in the display device. In some embodiments, the SDP of the display device may be ⅓.

BRIEF DESCRIPTION OF THE DRAWINGS

These and other aspects are better understood when the following detailed description is read with reference to the accompanying drawings, in which.

DETAILED DESCRIPTION

Figure 1A:
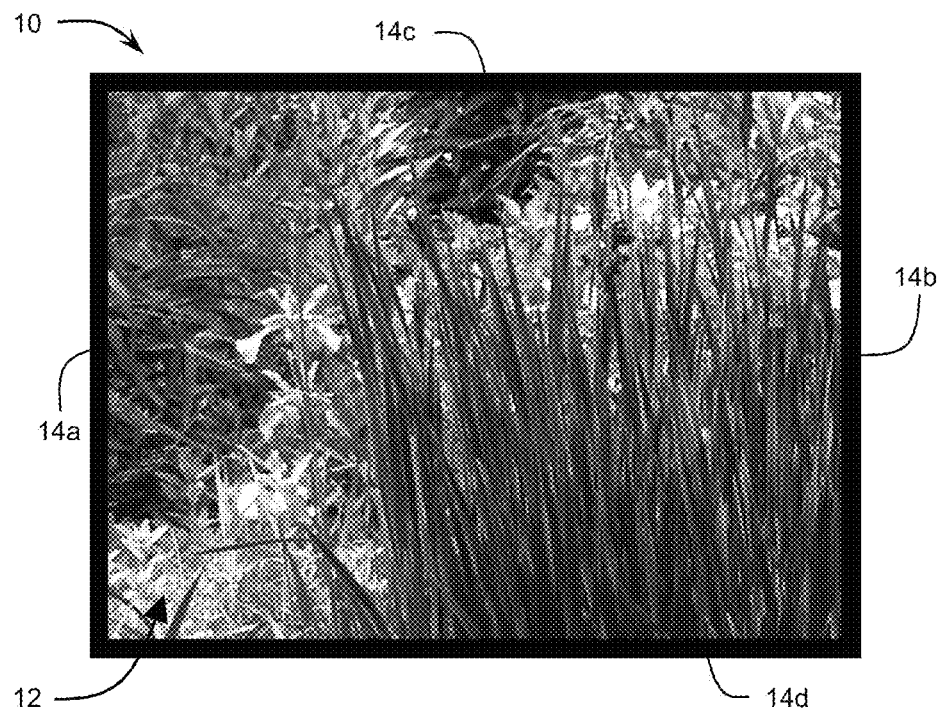
FIG. 1A is a front view of a display device comprising a display panel and a bezel.

Examples will now be described more fully hereinafter with reference to the accompanying drawings in which exemplary embodiments are shown. Whenever possible, the same reference numerals are used throughout the drawings to refer to the same or like parts. However, aspects may be embodied in many different forms and should not be construed as limited to the embodiments set forth herein.

The aesthetics of display devices, such as television display panels, computer monitors, and laptop display panels, are affected by the size and appearance of a bezel that exists around a perimeter of such display devices. The bezel of a display device may be used, for example, to house electronics for driving the pixels of the display panel, as well as, in certain instances, to provide backlighting for the display device. For example, an LCD television display panel may include a plurality of backlighting light emitting diodes (LEDs) maintained within the bezel region of the display device.

The trend over the last few years has been toward smaller and smaller bezels. Current bezel widths are on the order of 3.0 mm to 10 mm. However, television models having very large display panels have achieved bezel regions having a width as small as 2 mm on at least two borders, and 4 mm on the other two borders. However, the presence of a bezel, even though small, is still distracting, especially when the display devices are assembled in a tiled arrangement to form a very large displayed image. The bezels of such tiled display devices give the undesirable appearance of an image "grid," rather than a cohesive large image without seams. The eye is very sensitive to the presence of a black line separating tiled display devices, which makes such an image unsightly.

Embodiments of the present disclosure include bezel-concealing display covers that conceal the bezel so that its presence is not visible, or at the least not noticeable to the observer within a predictable viewing angle. Such display covers can be formed from glass, for example. In some embodiments the glass can be a chemically strengthened glass.

Figure 1B:
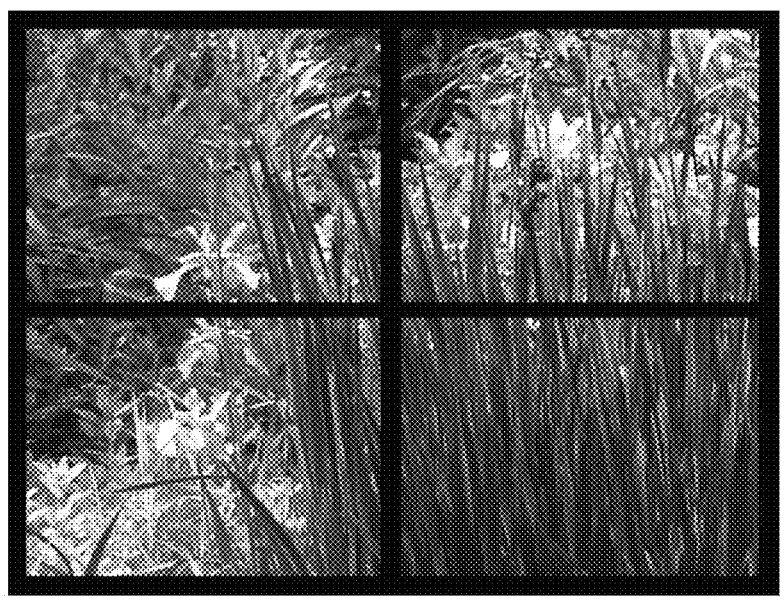
FIG. 1B is a front view of a tiled array of display devices.

Referring now to FIG. 1A, a display device 10 configured as a flat display panel television is illustrated. While the following description is primarily in terms of televisions, it should be noted that embodiments described herein may be suitable for other display devices and therefore the described embodiments are not limited to televisions. Display device 10 comprises a display panel 12 that has a bezel 14 positioned around its perimeter. Bezel 14 comprises bezel portions 14a-14d. The bezel portions 14a-14d may enclose display drive electronics, as well as backlighting hardware to backlight the display panel portion 12, such as edge light emitting diodes (LEDs). The bezel portions 14a-14d may have a particular width, such as between 3 mm and 10 mm, for example. The bezel portions 14a-14d may be distracting to a viewer, particularly if several display devices are arranged in a matrix in order to view the entire image, as illustrated in FIG. 1B.

Figure 2:
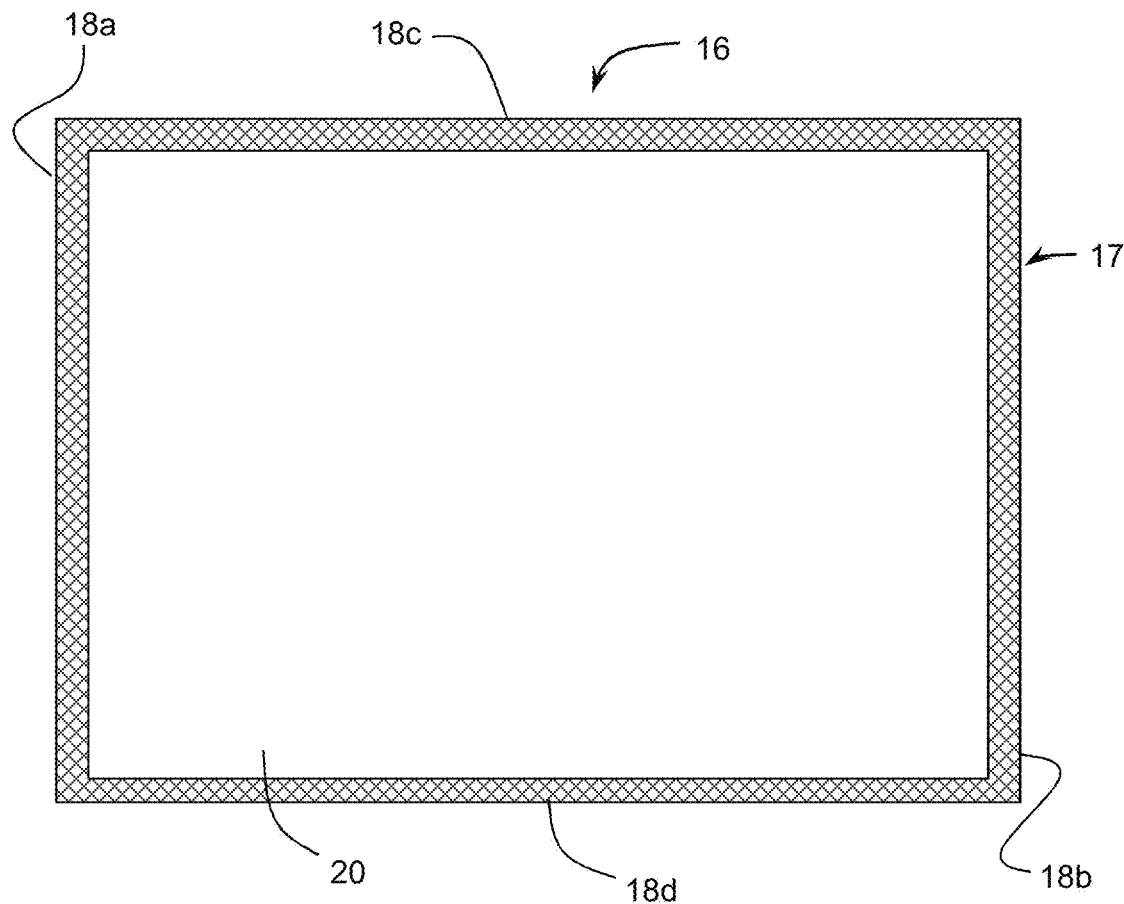
FIG. 2 is a front view of a display cover including prism regions for concealing a bezel.

FIG. 2 schematically depicts a bezel-concealing display cover 16 according to one embodiment. The bezel-concealing display cover 16 of the illustrated embodiment is configured to be mechanically coupled to a display device (e.g., a display device 10 as illustrated in FIG. 1A). The bezel-concealing display cover 16 should be mounted on the display device 10 such that there is a gap (e.g., a low index gap or an air gap) between the bezel-concealing display cover 16 and the surface of the display device 10. In one embodiment, the bezel-concealing display cover 16 is coupled to the display device 10 by transparent pillars (not shown) at the corners of the bezel-concealing display cover 16.

The bezel-concealing display cover 16 may, for example, comprise a perimeter portion 17 including four prism portions 18a-18d adjacent to the perimeter of the display cover. As described in more detail below, prism portions 18a-18d comprise many prisms arranged in an array that act as a light bending (refracting) filter to the regions of the display panel 12 that are positioned behind the bezel portions 14a-14d relative to the observer. The display cover and the light bending filters provided by the prism portions 18a-18d make it possible to conceal the bezel so that its presence is not visible, or at least not readily apparent to the observer within a predictable viewing angle.

In some embodiments, the bezel-concealing display cover 16 may further comprise a visually transparent central region 20 bounded by the prism portions 18a-18d that does not contain any prisms and is therefore substantially flat. In other embodiments, the bezel-concealing display cover 16 does not include a central region such that only a frame defined by the perimeter portion 17 is provided.

The bezel-concealing display cover 16 may be made of glass. For example, the glass may be a chemically strengthened glass such as an ion exchanged glass, an acid-washed glass, or both. Prism portions 18a-18d may, for example, be made from a commercially available light bending filter material that can be adhered to the display cover, such as Vikuiti image directing film (IDF II) manufactured by the 3M Company. It should be understood that Vikuiti is but one of many possible light bending filter solutions, and is presented herein as a non-limiting example only. In another example, light bending filters may be incorporated directly into display cover 16. For example, prisms may be formed directly in the display cover material. As described in more detail below, specialized light bending filters may be optimized and developed for the purpose of concealing the bezel from an observer. It is noted that a gap of approximately 2.7 times the desired lateral image shift may be needed when using the Vikuiti light bending filter.

In another embodiment, the prisms can also be part of a frame surrounding the display and made of a transparent material such as plastic or glass. The frame can be produced, for example, by injection molding and the mold itself can include the microprism structure necessary to produce the desired optical effect. In such embodiments, the central region 20 may be free space.

Figure 3A:
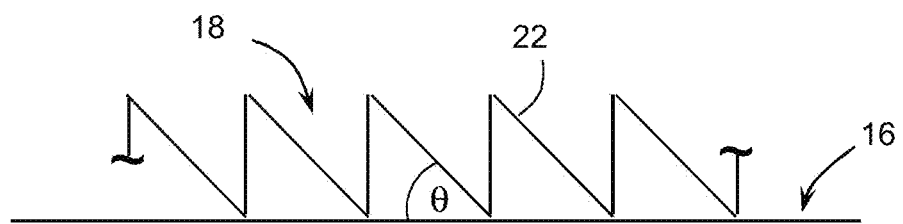
FIG. 3A is a schematic diagram of a portion of a prism region showing individual prisms according to one embodiment described herein.
Figure 3B:
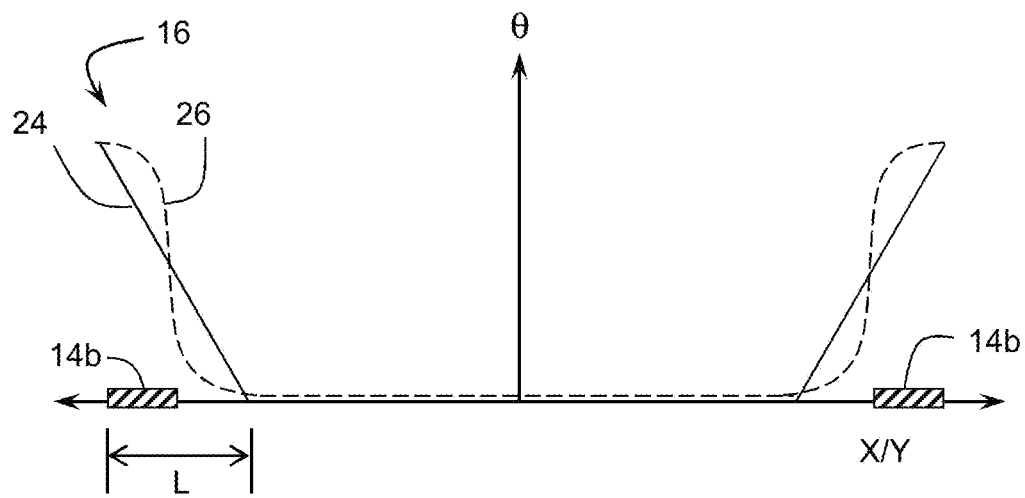
FIG. 3B is a graph showing the prism angle θ as a function of position on a display device.

Referring now to FIG. 3A, a portion of a prism region 18 positioned on a bezel-concealing display cover 16 is illustrated. The prism region 18 comprises many prisms 22 that are triangularly shaped. The prisms 22 are positioned on an outside surface of the display cover 16 (facing an observer) in the figure. The prisms 22 include a prism angle θ that cause the image near the bezel to be shifted, wherein the prism angle is the angle bounded by the faces (facets) of the prism through which light predominantly transits the prism. FIG. 3B is a graph showing the prism angle θ as a function of position on the display device 10. Generally, the angle θ of the prisms 22 should be at a maximum at the edge of the bezel-concealing display cover 16 and fall to zero (i.e., no prisms at all) away from the edges of the display cover. Accordingly, only a small portion of the image produced by display panel 12 will be shifted. The frequency of the array of prisms, that is the periodicity of the prisms, should be greater than the frequency of the pixels of the display panel to prevent aliasing in the resulting image. Generally, the prisms should have a size that is smaller than the pixels of the display panel. For example, the individual prisms may be as small as 1/10 the size of a single pixel of the display panel.

Solid curve 24 depicts an example in which the angle θ of the prisms decreases linearly from the edges of the bezel-concealing display cover 16 and falls to zero at the central region over a distance L. Dashed curve 26 depicts an example in which the angle θ of the prisms vary non-linearly over distance L. The more complicated profile of dashed curve 26 may be considered with the aim of avoiding disturbing image discontinuities.

Figure 4:
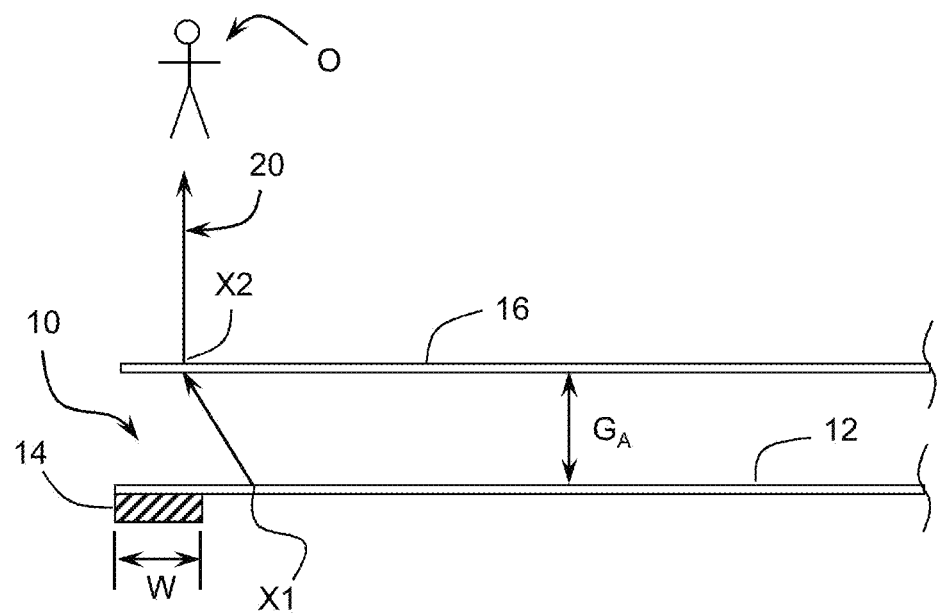
FIG. 4 schematically illustrates an observer located far away from a display panel of a display device that is covered with a bezel-concealing display cover.

FIG. 4 schematically illustrates an observer O located far away from a display panel 12 of a display device 10, wherein a bezel-concealing display cover 16 is positioned between the display panel and the observer O. A gap $G_A$ exists between the bezel-concealing display cover 16 and the display panel 12. This simulation traces light rays emitted from the display panel 12 to the observer O and indicates, for a given position X1 on the display panel 12, the position X2 where the light ray hits the bezel-concealing display cover 16. In one simulation, the prisms face the observer O, and the prism angle of the prisms vary linearly from 32° at the very edge of the bezel-concealing display cover 16 (i.e., above a portion of bezel 14), to 0° about 10 mm away from the outer edge of display cover 16. The index of refraction of the bezel-concealing display cover 16 in the simulation was 1.5, and the gap $G_A$ was about 15 mm.

Figure 5:
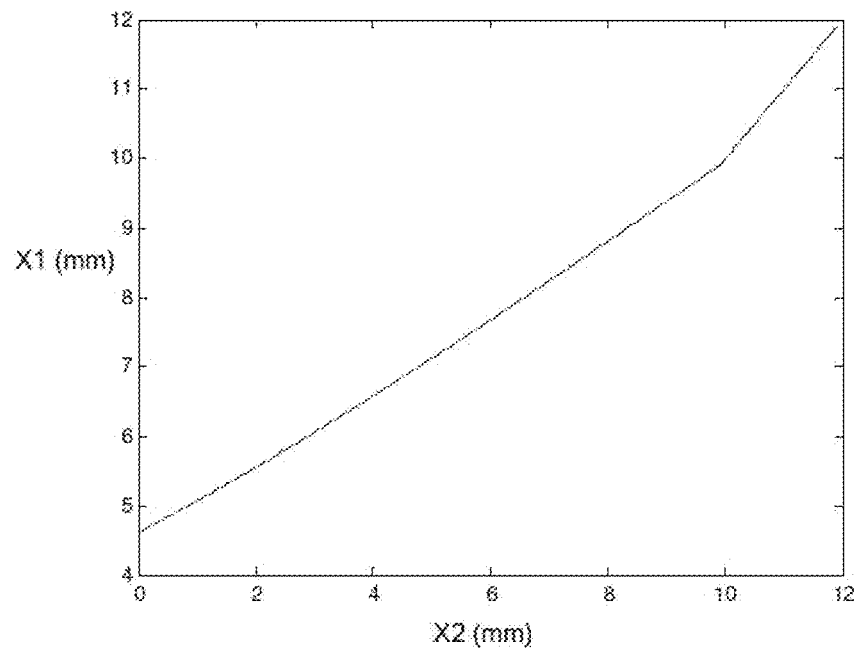
FIG. 5 is a plot of a position on the display device versus a position on the bezel-concealing display cover.

FIG. 5 is a graph of simulation results showing that, at the very edge of the bezel-concealing display cover 16 (X2=0), the position X1 on the display panel 12 of the display device 10 seen by the observer O is about 4.8 mm away from the edge of the display panel 12. Accordingly, the bezel 14 will be invisible to an observer if the size (width) of the bezel 14 is smaller than 4.8 mm.

Figure 6:
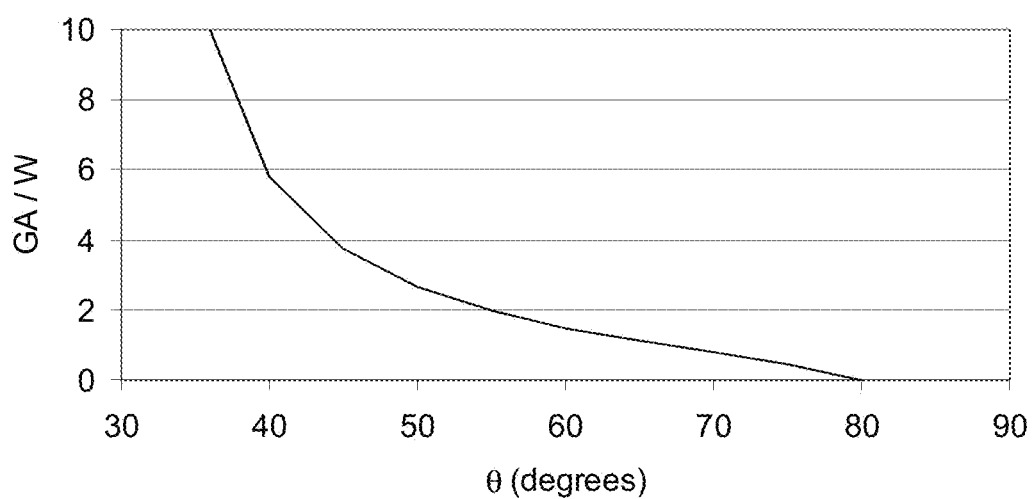
FIG. 6 is a plot of the ratio of gap distance D to bezel width W as a function of prism angle θ.

The amount of beam deviation that can be produced by a prism is a function of the angle θ of the prism. The graph depicted in FIG. 6 shows the ratio of gap $G_A$ to bezel width W as a function of prism angle θ assuming a refractive index of 1.5 and further assuming the bezel is to remain essentially invisible for a viewing angle of 20°. As an example and not a limitation, by using a prism angle θ of 45 degrees, the gap needs to be at least 4 times the width of the bezel (a $G_A/W$ ratio of 4).

Introduction of the bezel-concealing display covers described herein may introduce artifacts and/or distortions in the image displayed by the display device that may be visible to an observer. Described below are several image artifacts that may be introduced, as well as design parameters that may be optimized to minimize the appearance of such image artifacts and/or distortions.

Figure 12:
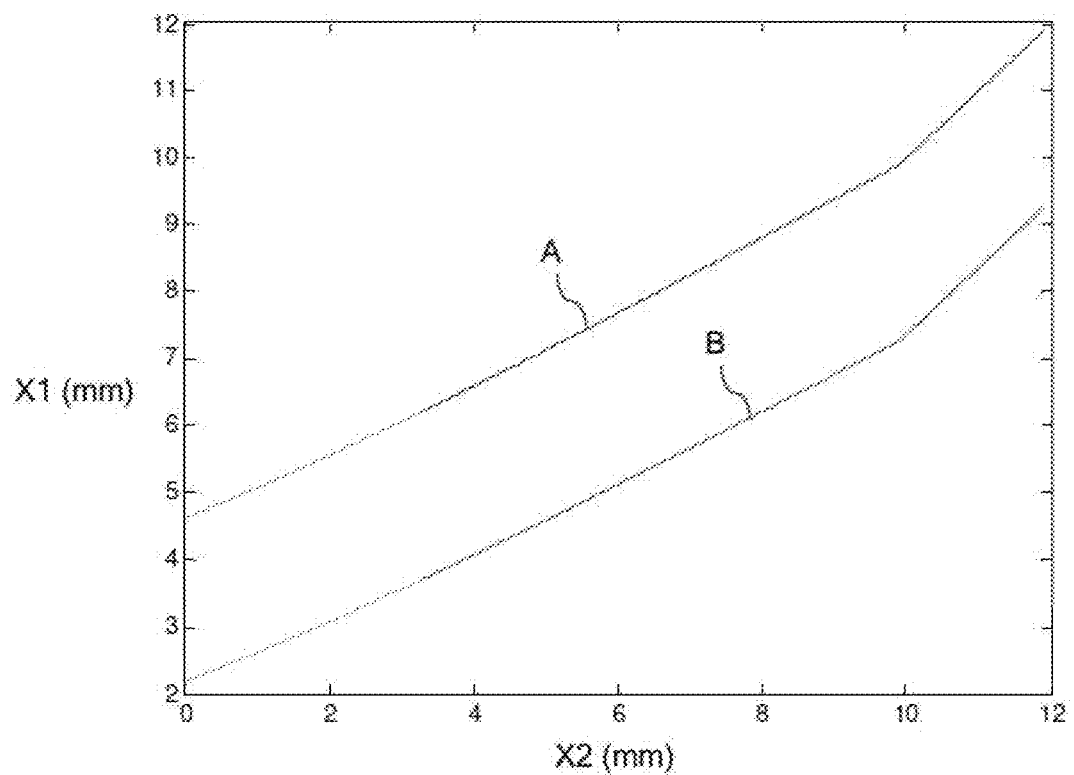
FIG. 12 is a plot of a position on the display device versus a position on the bezel-concealing display cover for a viewing angle at normal incidence and for a viewing angle at 10°.

The localized light bending filters provided by the preceding examples of a bezel-concealing display cover 16 near the bezel of a display device, such as display device 10, may produce local image magnification. A first impact of that local magnification is to introduce image deformation that can be compensated in part by using image distortion correction algorithms. Image distortion correction algorithms may manipulate the image displayed by the display panel 12 to minimize the appearance of magnification. However, because the distortion in the image is a function of the viewing angle γ (e.g., as shown in FIG. 12), the image can only be compensated for a given angle of vision (e.g., when the display is being viewed at normal incidence or some other static viewing angle γ).

Figure 7:
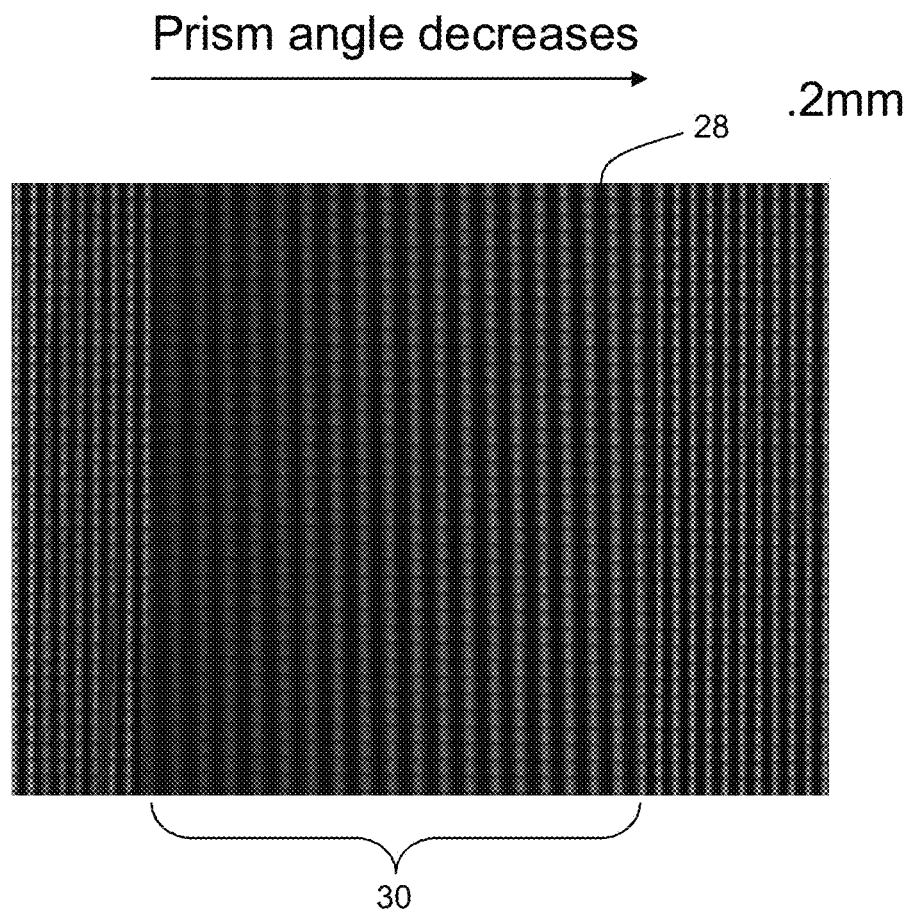
FIG. 7 is a view of an image as seen through a portion of a display cover comprising prisms, and showing localized image magnification (banding) at the prism location.

Another image artifact related to local magnification is that the image of individual pixels may be highly magnified, resulting in the introduction of colored or black bands into the image. FIG. 7 illustrates the case where the image is locally magnified by using a varying angle prism structure placed in front of a pixilated screen. Due to the magnification, broad dark 28 bands within region 30 resulting from the space between the pixels is highly magnified, thereby resulting in visibly noticeable black lines in the image. This effect is referred to as "banding".

Figure 8:
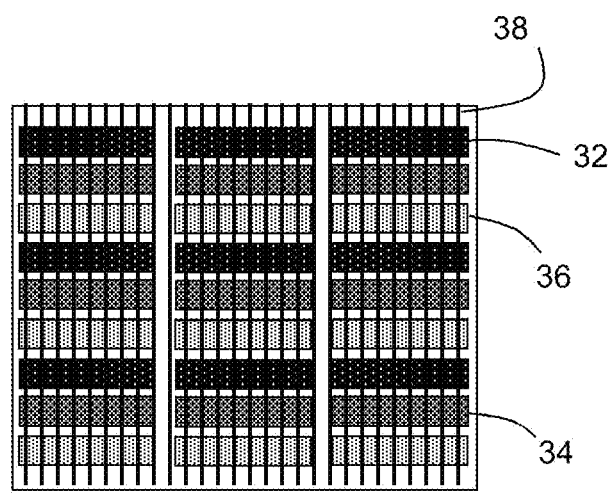
FIG. 8 is a schematic view of an array of red, green, and blue (RGB) pixels wherein the pixels are arranged orthogonal to the long axis of the prisms of the prism array to reduce banding.
Figure 9:
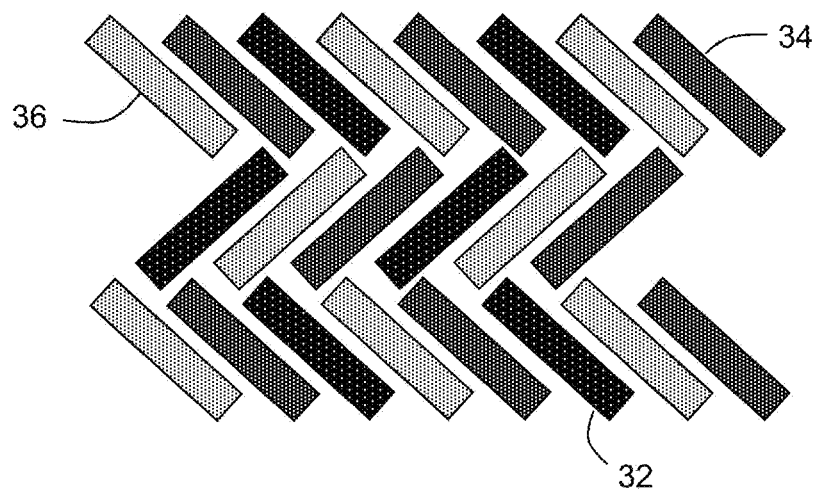
FIG. 9 is a schematic view of an array of RGB pixels arranged to reduce banding.

As an example, banding may be reduced or eliminated by minimizing the space between pixels of the same color. FIG. 8 depicts an example where the red, green and blue pixels (32, 34 and 36, respectively) of the display panel 12 are aligned orthogonal to the long axis direction of the prisms. Another approach is depicted in FIG. 9. This approach comprises aligning the pixels (e.g., the red, green and blue pixels, 32, 34 and 36, respectively) at a large angle with respect to one another (e.g., approximately 45 degrees) and shifting the colors every other line. In that case, the colored or black bands are shifted every other line and therefore become less visible.

Additionally, the size of the individual pixels may be manipulated to minimize the effects of magnification. A typical single pixel size in a large display, such as a 55" diagonal display, is about 0.7 mm, depending on the resolution, meaning that at a magnification factor of 5, the pixels are readily visible. This can be avoided by making the pixels of the display panel smaller or to have different geometries. For a magnification factor of 5, utilizing sub-pixels that would be 5 times smaller would eliminate perceived banding. From an electronic point of view, each set of sub-pixels may still be driven by the same transistor, thereby avoiding more complex electronic circuitry.

Figure 10:
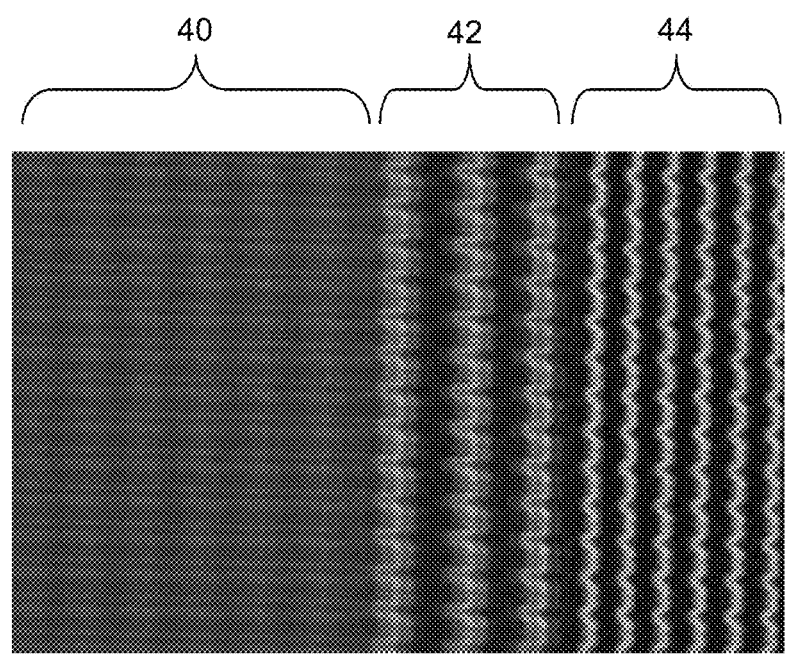
FIG. 10 is a view of a portion of an image as seen through a display cover comprising prisms, showing a portion with no prisms, a portion with prisms but without localized blurring and a portion with prisms and localized blurring.
Figure 11:
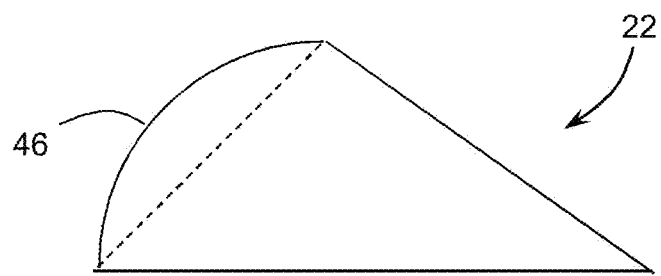
FIG. 11 is a schematic view of a prism comprising a curved front facet.

The bezel-concealing display cover may also be modified to reduce or eliminate banding. For example, banding may be reduced or eliminated by making the image of single pixels slightly blurry by introducing a roughness on the facets of the prisms, or by making those surfaces slightly curved instead of flat (i.e., adding a lens component to the prism). Suitable roughness can be obtained, for example, by diamond turning technology for creating a master and micro replication of the master. FIG. 10 depicts an image where a portion 40 of the prisms had curvature (partly blurred zone), and another portion 42 wherein the prisms had only flat facets (no blurring zone). As can be seen, the broad dark lines between the pixels are eliminated in portion 42. Portion 44 is seen without prisms. FIG. 11 is a schematic illustration of a prism 22 comprising a curved front facet 46.

When the observer does not view the display device 10 at normal incidence, the bezel 14 may be partly or wholly visible to the observer. Particularly, when the observer O is located very close to the display device 10, the observer will view all of the edges of the display cover at high angles of incidence, which may make all of the bezel portions visible and may give an impression, for example, of a television inside a box.

FIG. 12 is a graph that depicts simulation results regarding the position seen on the display device 10 in the same conditions as shown in FIG. 4 looking at the display device 10 at normal incidence (curve A), and similar conditions as shown in FIG. 6 with a 10° incidence angle (curve B, α=10). As shown in the graph, curves A and B are similar except that they are shifted with respect to one another. In first approximation, curve B is shifted by AG*sin(α), where AG is the air gap and a is the angle of vision. Therefore, at a relatively small viewing angle (e.g., 10°), the bezel will start to become visible. It is noted that the prism angles may be varied non-linearly to provide for larger viewing angles (see dashed curve 26 of FIG. 3B).

In some embodiments, a reduction in the visibility of the bezel at an increased viewing angle may be accomplished by adding a diffusing texture on the prism portions 18a-18d of the bezel-concealing display cover 16. The image may be partially blurred in this region close to the bezel portions 14a-14d because that part of the image is generated on the bezel-concealing display cover 16. However, having a 10 mm blurred area for a large television may not be a significant visual distraction because observers usually fix their attention near the center of the image, and peripheral information is not as significant. In some examples, prism portions 18a-18d may have prisms on each side of the bezel-concealing display cover 16 to enlarge the viewing angle.

Figure 13:
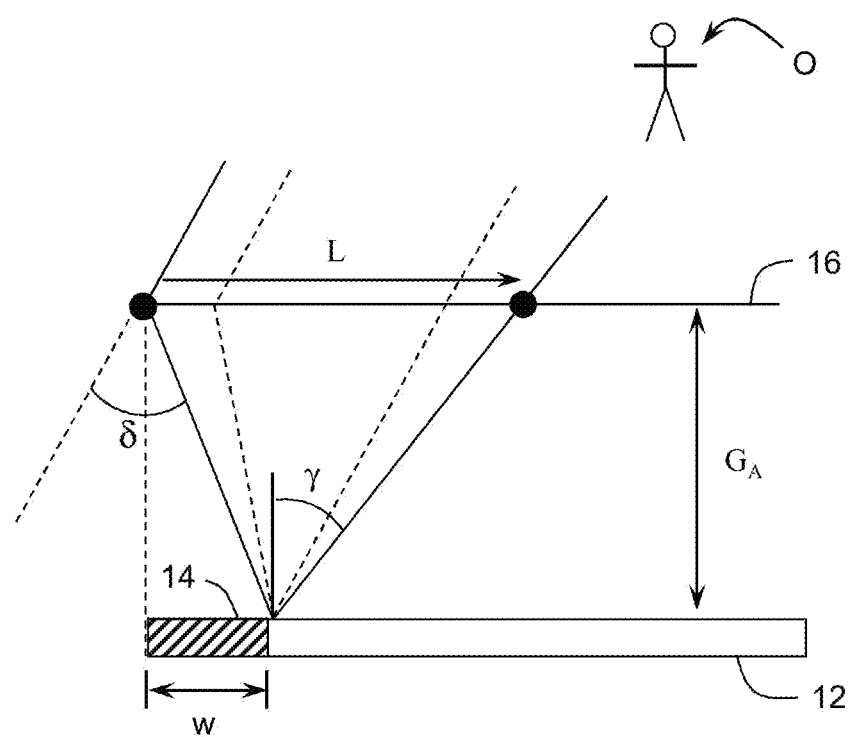
FIG. 13 is a schematic view of a display panel and bezel, and a display cover comprising an array of prisms distributed over a length L from an edge of the display cover.

Referring now to FIG. 13, consider that the observer O is looking at the display device 10 (e.g., a television) at a viewing angle of γ relative to a normal to display panel 12. To ensure bezel 14 is not seen at viewing angle γ, the deviation angle δ introduced by prisms 22 positioned on display cover 16 needs to be:

$$\delta = \gamma + \arctan(W/G_A)$$

or $$G_A = W/\tan(\delta - \gamma) \quad (1)$$

where δ is the prism deviation angle, γ is the viewing angle, W is the bezel width, and $G_A$ is the distance of the gap between display panel 12 and display cover 16. FIG. 13 also shows that the minimum distance L over which prisms should be positioned extending from the edge of the display cover toward an interior of the display cover is:

$$L = W + G_A \tan(\gamma) \quad (2)$$

Figure 14:
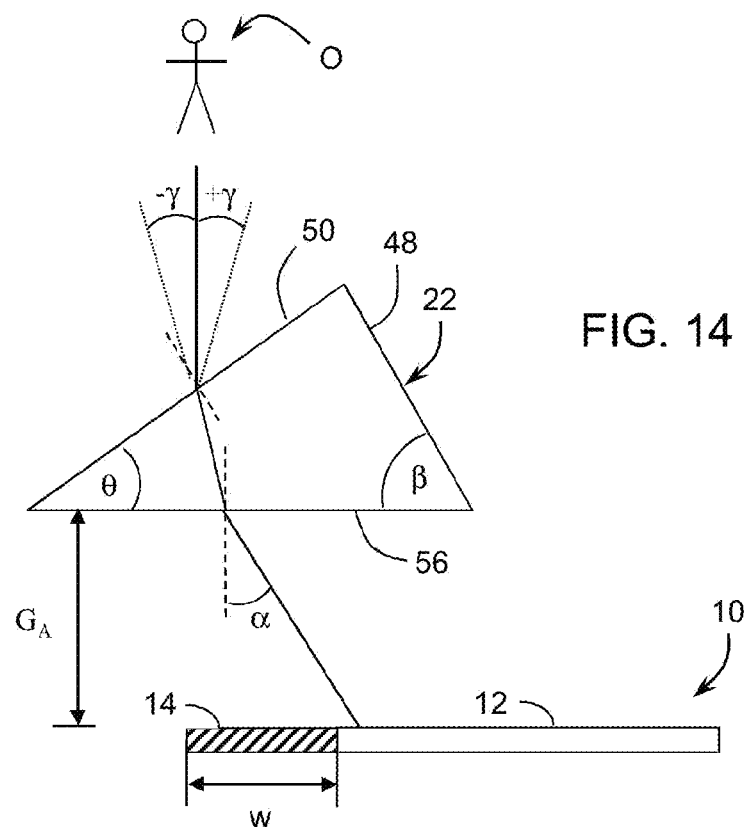
FIG. 14 is a schematic view of a display panel and bezel, and a single prism of the array of prisms of FIG. 13 illustrating positive and negative viewing angles and gap $G_A$.

Equation 1 shows that gap $G_A$ will decrease as the prism deviation angle δ is increased or the viewing angle γ is decreased, meaning the bezel 14 will become visible to the observer at a smaller viewing angle. Also, Equation 2 shows the needed length L of the distribution of prisms 22 from the edge of the display cover to conceal the bezel will decrease for small gaps $G_A$, meaning that image artifacts remain localized within a small portion of the image close to the edges of the display device. Referring now to FIG. 14, an observer O is depicted as viewing a display device 10 having a display panel 12 surrounded by a bezel 14 having a width W. A single prism 22 of an array of prisms is illustrated. The prism 22 has a front facet 50, a non-transiting facet 48, and a back facet 56. The back facet 56 and the front facet 50 define a prism angle θ. Assuming prisms 22 are facing the observer O (on the observer side of the glass cover), the deviation angle δ can be calculated relative to prism angle θ and the gap to bezel width ratio $G_A/W$ determined while fixing the viewing angle to different values.

Figure 15:
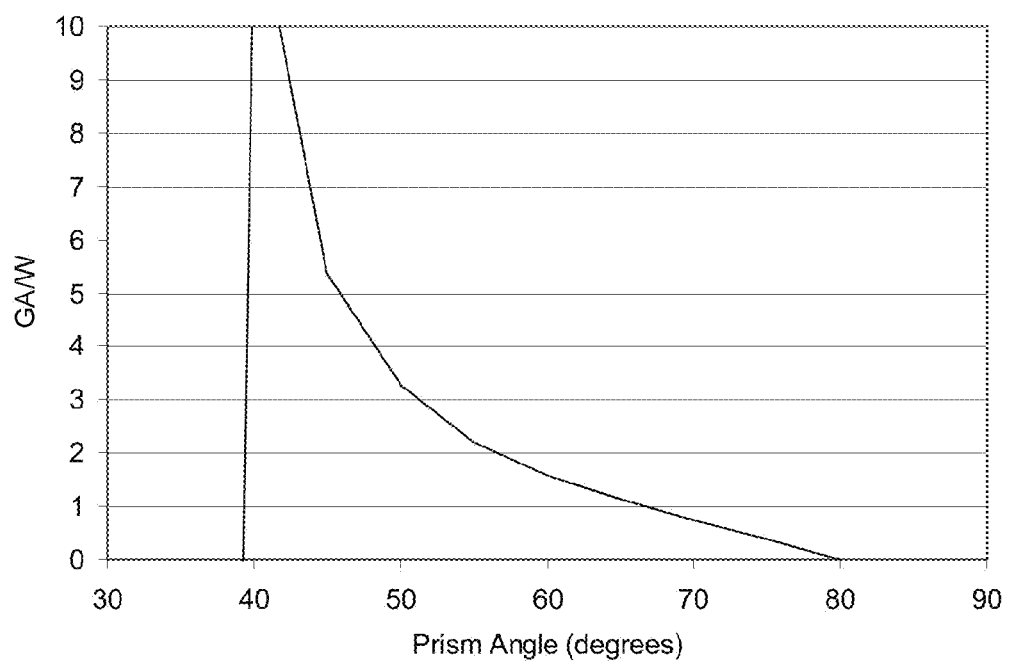
FIG. 15 is a graph of the gap/bezel width ratio as a function of prism angle θ.

FIG. 15 is a graph depicting the minimum gap—bezel width ratio $G_A/W$ by assuming it is desirable to maintain the bezel invisible up to a positive viewing angle +γ of +30 degrees. An index of refraction for the prisms was assumed as 1.56. As can be seen from FIG. 15, prism angle θ should be at least 55° to maintain the bezel invisible to the observer and keep a reasonable gap $G_A$. An optimal design for the configuration of the bezel-concealing display cover 16 may be a function of other image artifacts described in more detail below.

Figure 16:
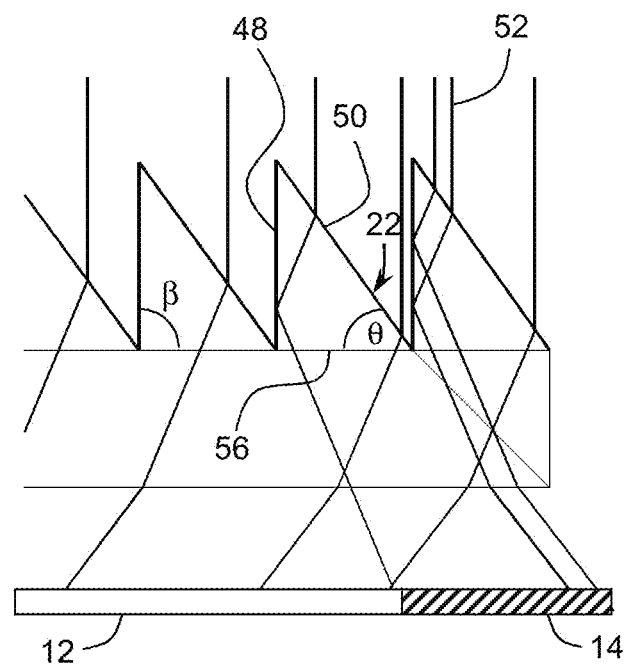
FIG. 16 is a schematic view of an array of prisms disposed on an observer side of a display cover illustrating internal reflection within the prisms that causes a view of the bezel.

FIG. 16 depicts a result when using prisms 22 with a small prism angle θ, and with the opposite, non-transiting facet 48 (a facet through which a ray of light does not transit) set at 90° to the adjacent, transiting front facet 50 (i.e., a right triangle formed by angle β). When viewing the display panel image along ray 52, the ray 52 is reflected by opposite facet 48 through total internal reflection and is propagated in a direction such that the bezel 14 is visible. As an example, with a prism angle θ of 55°, approximately 40% of the rays entering the prism are propagated in the wrong direction.

Figure 17:
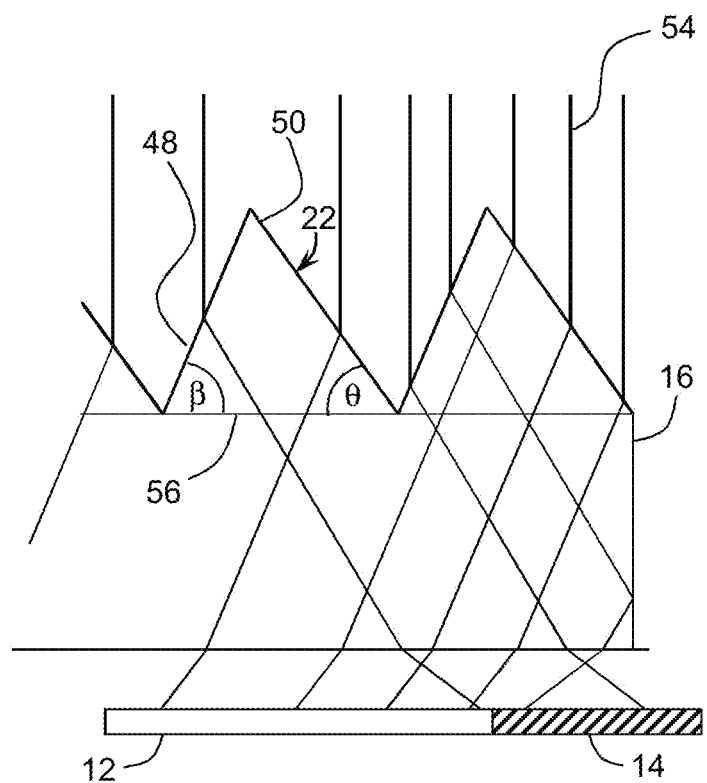
FIG. 17 is a schematic view of an array of prisms disposed on an observer side of a display cover illustrating angles of the prism set so that an observer views the image through two entry facets, thereby allowing a view of the bezel.
Figure 18:
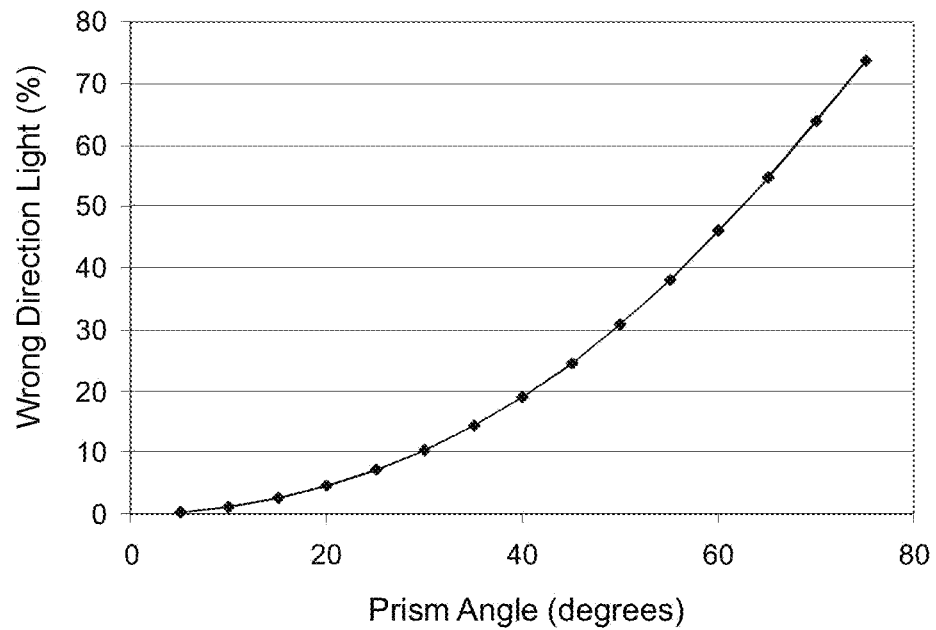
FIG. 18 is a graph of the percent observer view in a wrong direction (toward the bezel) as a function of prism angle θ.

Alternatively, the angle β of the prism 22 is such that a non-transiting facet of the prism 22 is parallel to the transiting ray 54 inside the prism is shown in FIG. 17. However, that part of the light will now be directly transmitted by one of the facets of prism 22 and, for a 55° prism angle θ, approximately 40% of light transiting the prism will still be propagated in the wrong direction. The graph in FIG. 18 shows the amount of light refracted in a wrong direction as a function of prism angle θ, and illustrates that for a prism angle θ of about 55°, about 40% of the rays go to the wrong facet, meaning that the image as seen by observer O will look dimmer at the edges. While 40% may be acceptable to most observers, it is assumed an amount of wrongly-deviated light greater than 40% is not visually acceptable. Consequently, the extended image will be dimmer at its edge, and a prism angle θ of 55° is the maximum prism angle to maintain the brightness decrease below 40%.

Figure 19:
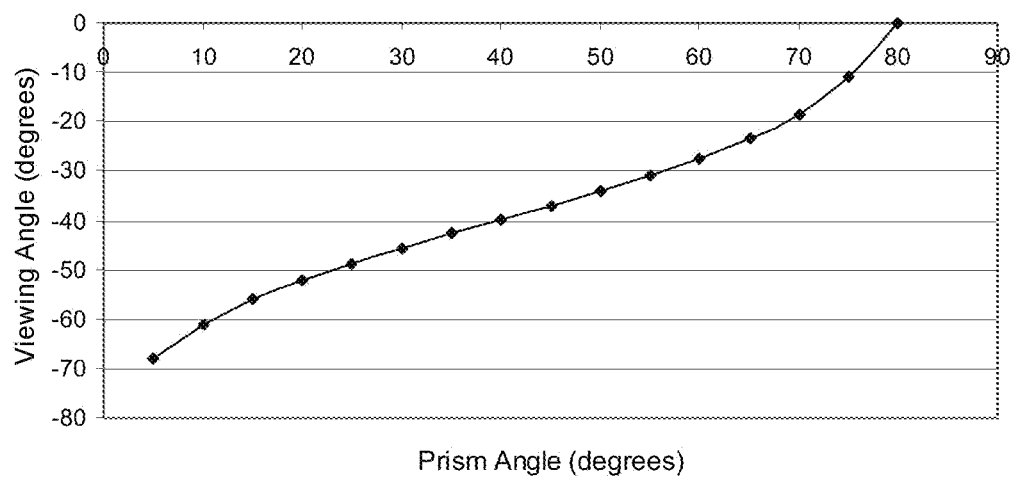
FIG. 19 is a graph of a viewing angle for which total internal reflection occurs as a function of prism angle.

Referring once again to FIG. 14, when the prism 22 is facing observer O and is positioned on a flat glass substrate, the back facet 56 (the facet at display cover 16) is parallel to the plane of display panel 12. At large negative viewing angles (-γ), the angle of incidence of a light ray at back facet 56, becomes very large and the ray is reflected in total internal reflection at back facet 56. The graph of FIG. 19 depicts prism angle θ as a function of the viewing angle γ for the onset of total internal reflection within a prism, and shows that for a prism angle θ of about 55°, total internal reflection begins at a viewing angle γ of about −31°. For a negative viewing angle −γ less negative than about −31°, prism 22 will look like a diffusing reflector.

Figure 20:
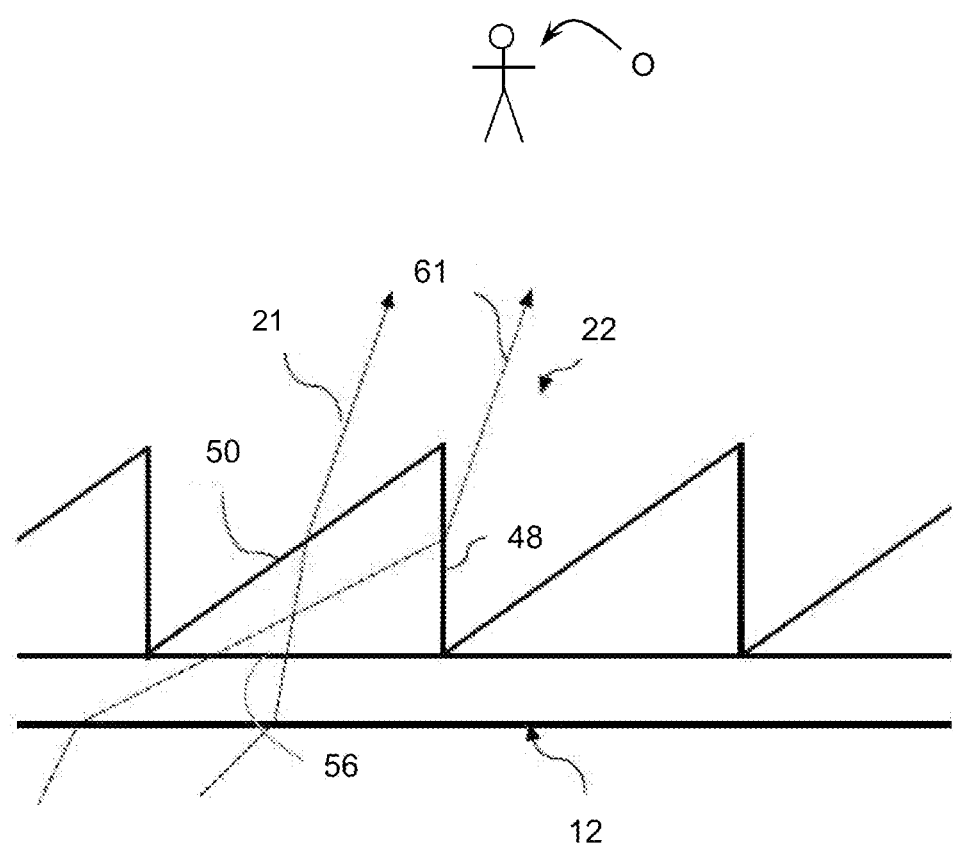
FIG. 20 is a schematic illustration of a prism of a bezel-concealing display cover producing a parasitic image.

In some instances, when the observer is viewing the bezel-concealing display cover 16 within a particular viewing angle range, he or she may see two, offset images. FIG. 20 depicts a portion of a bezel-concealing display cover 16 as seen by an observer O. The observer O sees two images: one shifted image that is created by light ray 21 propagating through a transiting front facet 50 of prism 22, and one parasitic image that is created by light ray 61 propagating through facet 48, which is supposed to be non-transiting. In one embodiment, the double-image is mitigated by making the non-transiting facet of each prism opaque such that light is prevented from being transmitted therethrough. For example, the non-transiting facets may be coated with an opaque coating (e.g., by an electrostatic painting process). Therefore, light may only pass through the transiting front facet 50 of the prisms 22.

Figure 21:
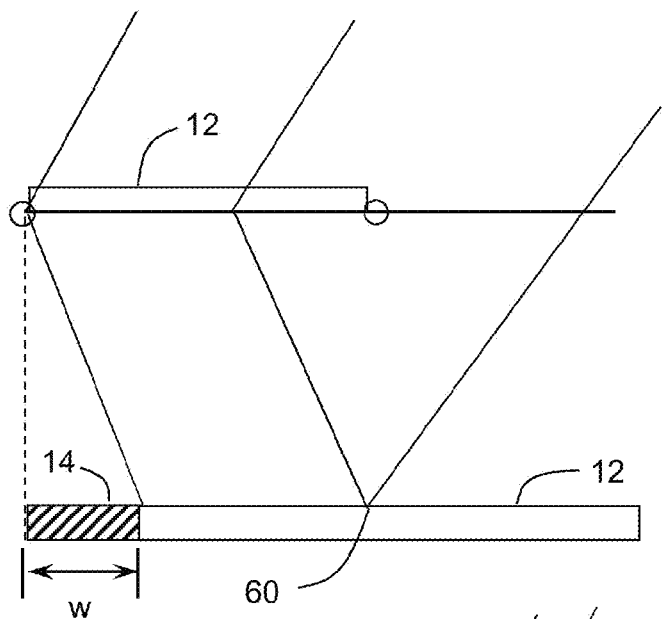
FIG. 21 is a schematic view of how an image point is viewed double by an observer when the prisms of a prism array on the display cover have equal angles.

Referring now to FIG. 21, when the prisms (e.g. prism 22) have a constant angle θ, objects (such as the image portion at point 60) near the edge of the display panel may be duplicated which can be visually disturbing. This distortion may be mitigated by blurring the image seen through the prisms 22. Alternatively, the prism angle θ may be slowly decreased spatially over a distance L from the edge of the display cover inward until deviation angle δ approaches zero. Assuming the prism angle deceleration is linear, the prism array becomes equivalent to a cylindrical Fresnel lens, and will have a focal point located somewhere in space.

Figure 22A:
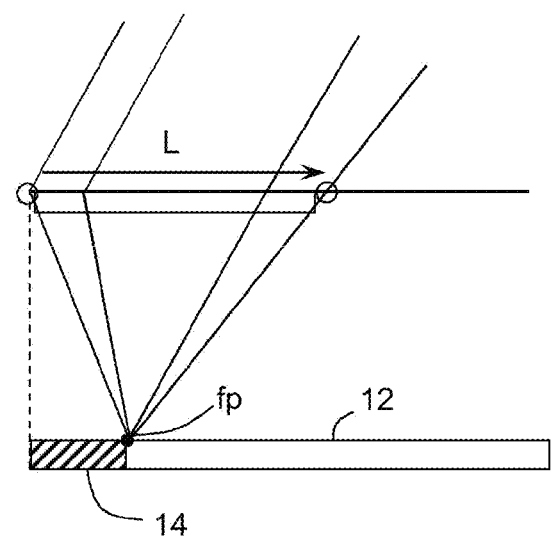
FIG. 22A is a schematic view of an array of prisms disposed on an observer side of a display cover wherein the prism angles of an array of prisms decreases at a slow rate over the length of the array of prisms from an edge of the display cover.
Figure 22B:
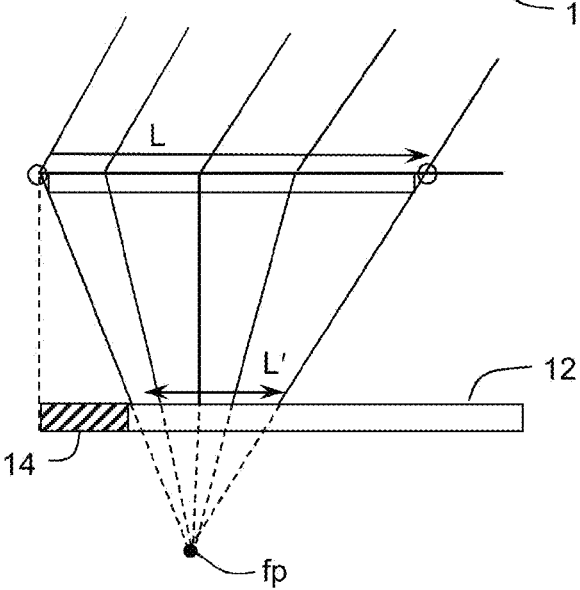
FIG. 22B is a schematic view of an array of prisms disposed on an observer side of a display cover wherein the prism angles of an array of prisms decreases at a fast rate over the length of the array of prisms from an edge of the display cover.
Figure 23:
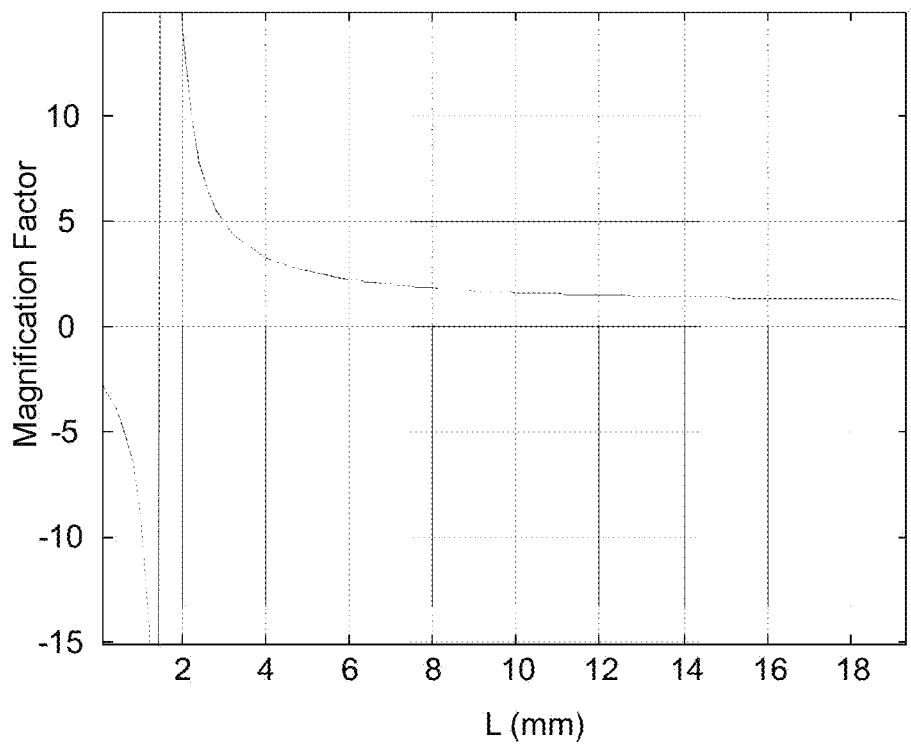
FIG. 23 is a graph of the magnification factor as a function of the distance from the edge of the display cover that the array of prisms extends.

FIGS. 22A and 22B show two different cases of prism angle deceleration. FIG. 22A schematically illustrates an example where the prism angle θ partially decreases rapidly. The focal point $f_p$ is located on the surface of the display panel. Accordingly, the distance L from the edge of the display cover 16 over which prisms are needed can be determined using Equation 2 above. However, in this instance, all the light seen by observer O is coming from the same point, resulting in a large magnification factor. FIG. 22B schematically illustrates an example where the prism angle θ spatially decreases more slowly than the example depicted in FIG. 22A. For the slower spatial decrease in prism angle θ shown in FIG. 22B, the focal point $f_p$ is located behind display panel 12 and the magnification factor (L/L') is reduced. However, the distance L over which prisms will be needed increases, meaning other defects, such as total internal reflection described above, will be seen on a larger portion of the image. Consequently, as an example and not a limitation, a prism angle θ in a range from about 50° to about 60°, for example about 55°, may provide an adequate compromise, and results in a gap $G_A$ of about 10 mm for a 4 mm wide bezel.

The above-described image artifacts may be mitigated by balancing the various artifacts and developing a design process to design an optimum bezel-concealing display cover 16 for the intended viewing angles and distances. An exemplary process of determining an appropriate design is described below. First, the positive viewing angle +γ at which bezel 14 becomes visible may be determined. For example, during testing, a positive viewing angle of about 30° resulted in an acceptable gap. Second, the gap to bezel ratio as a function of a starting prism angle θ may be determined. In accordance with the graph of FIG. 15, a +30° viewing angle, the $G_A/W$ ratio is about 2.2 for a starting prism angle $θ_1$ of 55°. Next, it may be determined if the starting prism angle $θ_1$ (i.e., 55° for this example) results in an acceptable amount of light leaking through the wrong facet as well as the angle where the prisms begin to produce total internal reflection of the incoming light rays. Because using very large prism angles creates image artifacts, the starting prism angle $θ_1$ should be reasonably small, for example, equal to or less than about 55°.

Once a starting prism angle $θ_1$ is selected, an angle deceleration rate is determined. The deceleration rate should be as fast as possible so that image artifacts remain localized in a small area, but also decelerate slow enough such that pixel magnification (banding) is not too high. For a linear deceleration, the magnitude of image magnification is very high at the edge of the image, resulting in localized pixel magnification. In some instances the magnification can be negative, meaning the image is inverted. This effect is due primarily to the spherical aberration generated by the Fresnel lens. FIG.

Figure 24:
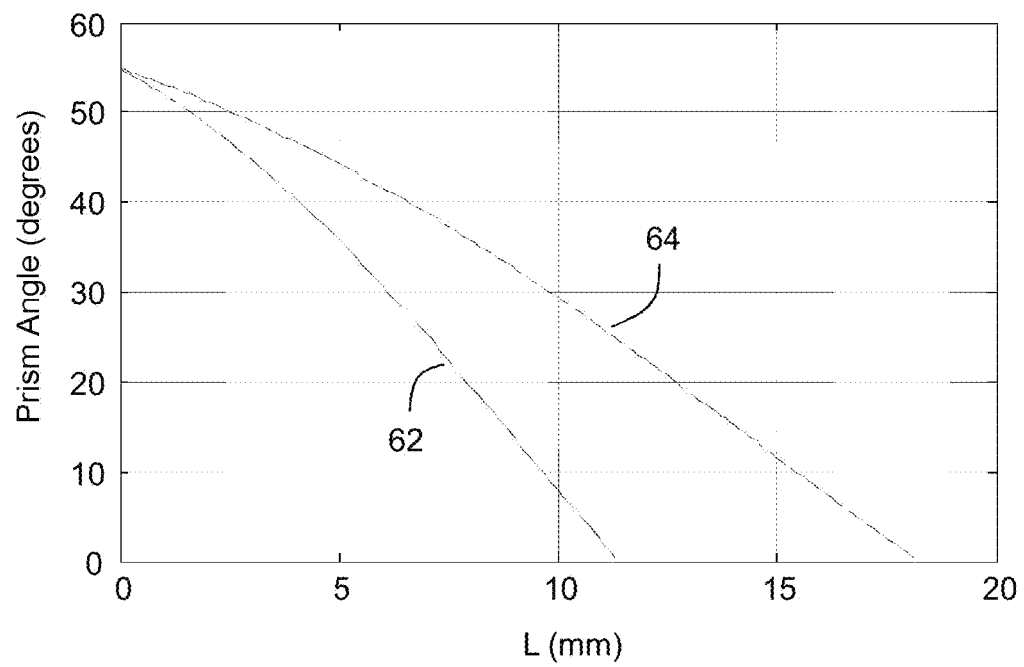
FIG. 24 is a graph of prism angle as a function of the distance from the edge of the display cover that the array extends for a given magnification factor.

23 depicts image magnification as a function of a distance L from the edge of the display cover. Accordingly, a magnification factor can be selected by computationally holding the magnification factor constant as the prism angle deceleration rate is increased. It can be shown that this is equivalent to adding aspherization to the Fresnel lens design. FIG. 24 shows prism angle variation by fixing the magnification factor respectively at five (curve 62) and two (curve 64).

Example 1

A starting prism angle of 55° was selected with a magnification factor of 2, resulting in a prism array length L (distance from the edge of the display cover over which the prism array extended) of about 18 mm. The gap $G_A$ was determined to be approximately 9 mm for a 4 mm bezel width. Accordingly, the onset of bezel visibility would occur at a viewing angle of approximately 30° and the onset of total internal reflection would start at a viewing angle γ of −30°.

Example 2

A starting prism angle of 55° was selected with a magnification factor of 5, resulting in a prism array length L of about 11.3 mm. The gap $G_A$ was determined to be approximately 9 mm for a 4 mm bezel width. Accordingly, the onset of bezel visibility would occur at a viewing angle of approximately 30° and the onset of total internal reflection would start at a viewing angle γ of −30°.

Example 3

A starting prism angle of 55° was selected with a magnification factor of 2, resulting in a prism array length L of about 45 mm. The gap $G_A$ was determined to be approximately 22 mm for a 10 mm bezel width. Accordingly, onset of bezel visibility would occur at a viewing angle of approximately 30° and the onset of total internal reflection would start at a viewing angle γ of −30°.

Figure 25:
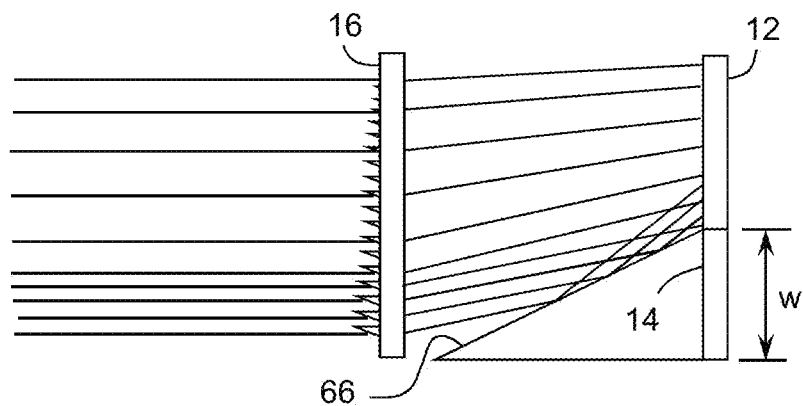
FIG. 25 is a schematic view of a display cover comprising prisms and a display panel, wherein a reflector is positioned between the display cover and the display panel.

As described above, as the viewing angle becomes more positive, the bezel 14 becomes visible. Referring now to FIG. 25, visibility of the bezel 14 may be mitigated by providing a reflecting surface 66 to deviate light rays that would otherwise strike the bezel 14 (i.e. in a reverse direction, to avoid viewing the bezel 14). The reflecting surface 66 may be either polished and act as a mirror, or have some structure to partly diffuse light and make the reflected portion of the image partly blurred (fuzzy).

Figure 26:
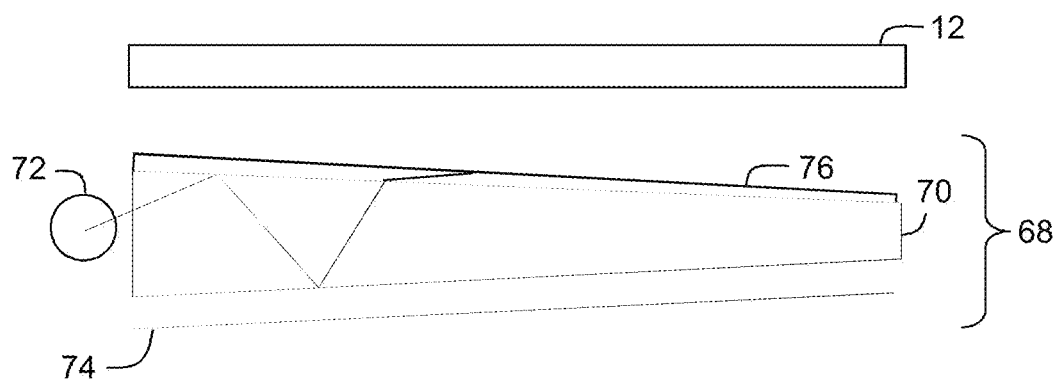
FIG. 26 is a cross sectional side view of a light guide plate comprising a prism array at one surface of the light guide plate.

As explained above, the edge of the image may appear dimmer due to light leaking through the wrong prism facet, or being reflected by it. Another way to avoid such leakage comprises making the image locally brighter. For example, the amount by which the image appears too dim when the observer is at normal incidence may be calculated, and the image produced by the display panel 12 made correspondingly brighter. This can be done either by image processing (in which case it only works if the image itself is dim at the edge) or by backlighting. FIG. 26 depicts a backlight assembly 68 according to one embodiment. The exemplary backlight assembly includes a light source 72, a reflecting surface 74, and a light guide plate 70. The image can be made locally brighter by increasing how much light is leaking out of the backlight light guide plate 70. It can be shown that this can be accomplished, for example, by attaching a shallow prism array 76 on the light guide plate.

Alternatively, the image can be blurred by an amount at least equal to the pixel size. This can be accomplished by introducing noise (small deviations) into the angles of the prisms, or by making the output facet of the prisms to have curvature as previously described in respect of FIG. 11.

Figure 27:
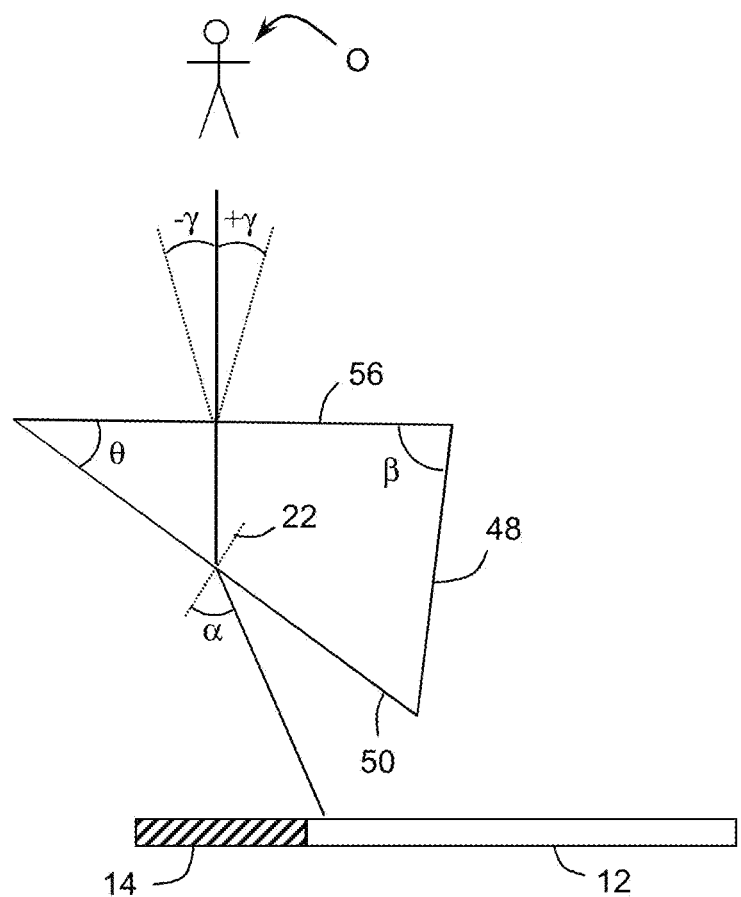
FIG. 27 is a schematic view of a single prism of an array of prisms disposed on a display cover, wherein the prisms are positioned on the display panel side of the display cover.

FIG. 27 illustrates an embodiment of the present disclosure wherein the prisms 22 are facing toward display panel 12, rather than away as in the embodiments described above. In this instance, the entry face of the prism (facet 56) is pointing in the wrong direction. In other words, for a given light ray deflection angle, the angle of the exit ray over the prism facet (α) is necessarily larger than when the prisms are facing observer O (since in that case, facet 56 is parallel to the display). As a result, total internal reflection will occur for a much smaller viewing angle.

Figure 28:
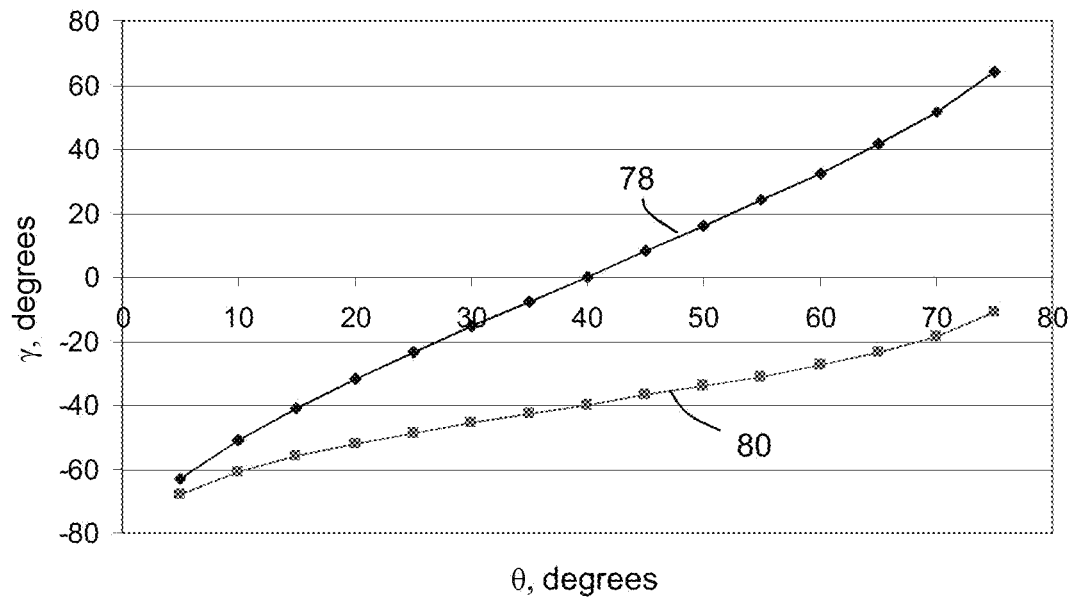
FIG. 28 is a graph of the angle for the viewing angle at which total internal reflection occurs as a function of prism angle for prisms positioned on the observer side of the display cover and prisms positioned on the display panel side of the display cover.

FIG. 28 is a graph that shows the viewing angle γ at which prisms 22 produce total internal reflection in two situations: when the prisms are facing the observer (curve 78), or when the prisms are facing the display panel 12 (curve 80). As an example, for a prism angle θ of 40°, prisms 22 are in total internal reflection for all negative viewing angles −γ when facing display panel (curve 80) while total internal reflection only begins for negative viewing angles −γ less negative than −40 degrees when prisms 22 are facing the observer. Consequently, when positioning prisms 22 on the back side of a flat cover facing display panel 12, the prism angle θ will need to be very small to avoid total internal reflection and a large gap.

Figure 29:
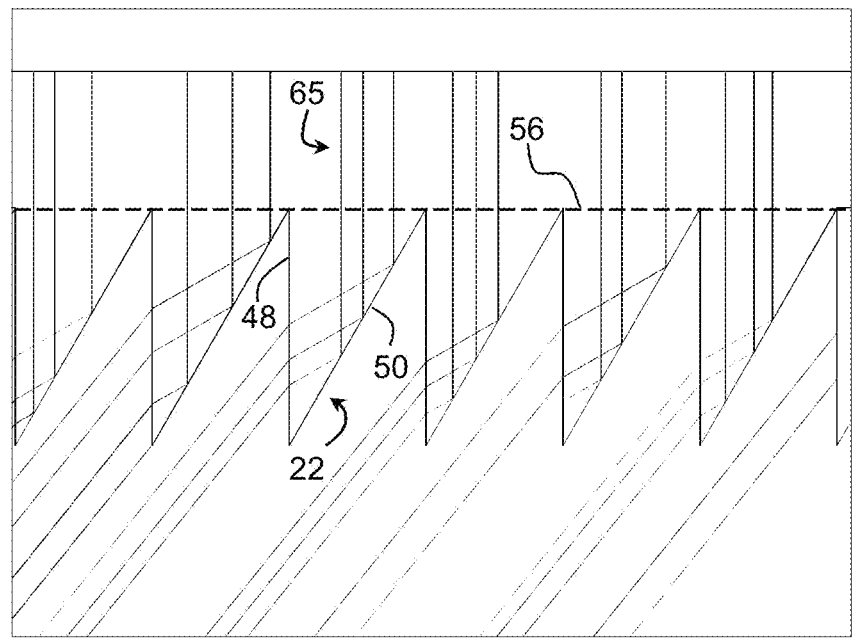
FIG. 29 is a schematic view of an array of prisms positioned on the display panel side of the display cover illustrating total internal reflection.

Referring now to FIG. 29, because microprisms facing display panel 12 tend to produce total internal reflection, in some embodiments the total internal reflection mode may be selected to be the nominal mode that is viewed by the observer. FIG. 29 illustrates an embodiment wherein one of the facets (e.g., facet 50) produces total internal reflection and the other facet (e.g., facet 56) is in transmission. More particularly, light rays enter the prisms at facet 48, are reflected at facet 50 by total internal reflection, and exit the prisms at facet 56. Because facet 50 is producing reflection of incoming light rays 65, very large deflection angles can be produced independent of the refractive index of the prisms. This allows for an extremely small gap $G_A$ between the bezel-concealing display cover 16 and the display device 10.

As noted hereinabove, the bezel-concealing display cover 16 may be formed by adhering a light bending filter material to the surface of a glass sheet (or a glass frame) which, in turn, is attached to the display device. The filter material may be formed from a film of transparent polymeric material in which the array of prisms is formed. In one particular embodiment, the array of prisms is formed by diamond turning a master pattern on a drum or cylinder and, thereafter, using the drum with the master pattern to impart the array of prisms onto a film of polymeric material. Alternatively, the array of prisms may be formed on the polymeric material by wrapping a film of the polymeric material around a drum and using diamond tooling to machine the array into the surface of the polymeric material as the drum is rotated. For example, FIG. 30 schematically depicts a portion of a film 100 of transparent polymeric material in which an array of prisms 118 is formed in the surface 102 of the film 100.

Figure 30:
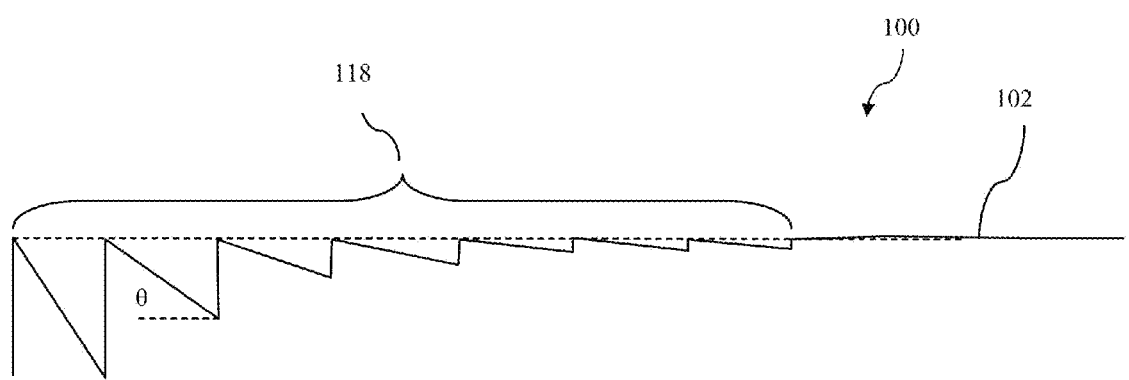
FIG. 30 is a schematic view of an array of prisms formed in the surface of a film of transparent polymeric material without an offset, according to one or more embodiments shown and described herein.

Forming the array of prisms directly in the polymeric material as depicted in FIG. 30 using the diamond tooling may be difficult given the fine dimensions of the individual prisms. Specifically, the absolute depth of the diamond tool in the film may not be very well controlled and may vary over time, particularly at shallow depths. For example, thermal fluctuations during the machining process may significantly change the diameter of the drum as the array of prisms 118 is machined which, in turn, may alter the depth of the pattern. In addition, the hydroscopy of the material may significantly increase the thickness of the film during machining which, in turn, may create inconsistencies in the array of prisms.

Figure 31:
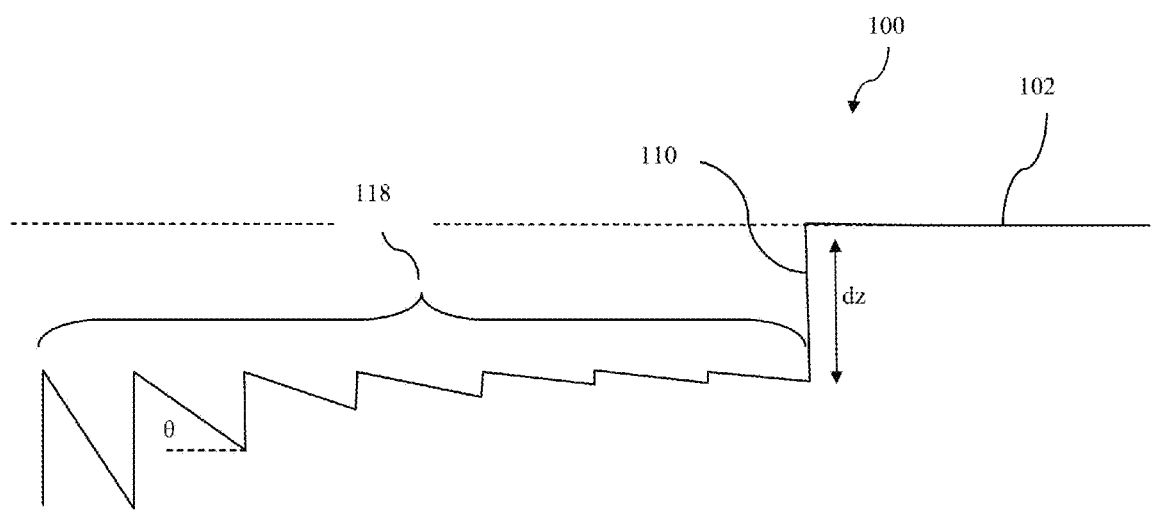
FIG. 31 is a schematic view of an array of prisms formed in the surface of a film of transparent polymeric material with an offset, according to one or more embodiments shown and described herein.

Referring now to FIG. 31, it has been determined that these manufacturing anomalies may be mitigated by forming the array of prisms 118 in the surface 102 of the film 100 of polymeric material such that the array of prisms 118 is offset from and positioned below the surface 102 by an offset spacing dz, as is schematically depicted in FIG. 31. However, offsetting the array of prisms 118 from the surface 102 of the film 100 introduces a step feature 110 (i.e., a feature which intersects with the surface 102 at a 90° angle) into the film 100. The step feature 110 scatters light and creates an image artifact (specifically a bright line) visible in the image displayed through the film 100.

In one embodiment, the light scattered by the step feature 110 is mitigated (and the corresponding image artifact eliminated or reduced) by controlling the dimension of the step feature, particularly the offset spacing dz. More specifically, the optical path difference between the array of prisms 118 and the surface 102 of the film 100 of transparent polymeric material is the product of the index of refraction n of the film 100 and the offset spacing dz (i.e., OPD=(n−1)*dz). The optical path difference is the difference between the optical path through air and the optical path through the film of polymeric material. It has been found that forming the film 100 such that the OPD is equal to an integer k times the median wavelength of the light transmitted through the film 100 (i.e., OPD=k*λ) will minimize the diffraction of light by the step feature 110, rendering the step feature 110 invisible and eliminating the associated image artifact. Using these relationships, an appropriate value of the offset spacing dz can be determined by setting (n−1)*dz equal to k*λ.

Figure 32:
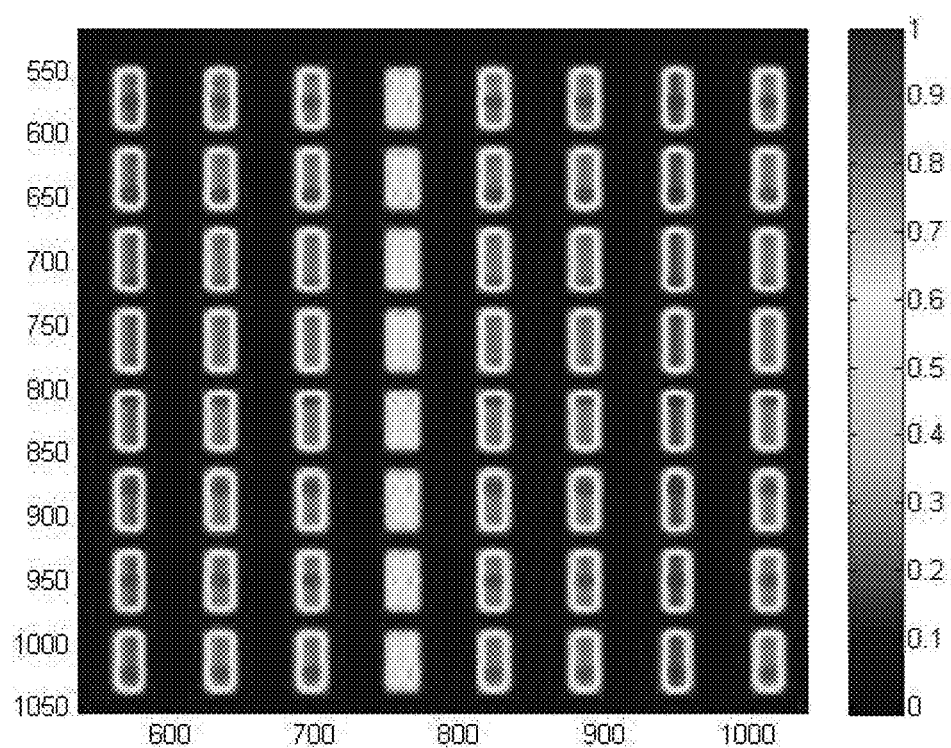
FIG. 32 is a histogram of pixel intensity as a function of pixel position for the array of prisms of FIG. 31.

Referring to FIG. 32 by way of example, a histogram of pixel intensity of a display is graphically depicted as a function of pixel position relative to a transparent film of polymeric material having an array of prisms 118 (as depicted in FIG. 31) attached to the display. For this simulation, the pixel pitch of the display was set to 0.7 mm and the pixel-to-film distance (gap $G_A$ hereinabove) was set to 25 mm. For purposes of this simulation, the optical path difference OPD was set to ½ the wavelength to illustrate the image artifacts which appear in the worst case scenario (i.e., OPD≠k*λ). The simulation or model involved propagating light from the source (i.e., pixels of a display) through the transparent film and up to an observer eye. Each portion of the corresponding optical path was calculated using a Fourier optics model assuming the source is a single point. To take into consideration the spatial extent of the pixels, many emitting points covering the pixel extent were considered and the final image calculated as the sum of the intensities calculated for all single emitting points. As shown in FIG. 32, the pixels of the display which correspond to the prisms immediately adjacent to the step feature 110 have a diminished intensity relative to other pixels in the array as the light emitted from these pixels which passes through the prisms is scattered by the step feature 110. As a result, the light from these pixels appears to be attenuated by as much as 13% relative to other pixels in the array. This attenuation manifests as a visible line in the resultant image. However, when the optical path difference OPD is set to an integer multiple of the wavelength, (i.e., OPD=k*λ), the light from the pixels is not attenuated which, in turn, mitigates the appearance of image artifacts.

The visibility of the image artifact or "line" graphically depicted in FIG. 32 can be characterized by its contrast. To graphically model the contrast of the image artifact, the following equations can be utilized:

$$OPD=(n-1)dz;\ \text{and}$$

$$OPD=k\lambda+\Delta OPD,$$

where OPD is the optical path difference, n is the index of refraction of the film of polymer material, dz is the offset spacing, k is an integer (i.e., 1, 2, 3 . . . ), and λ is the wavelength (assuming monochromatic conditions), as described above. ΔOPD is the optical path mismatch difference which is used to account for deviations from having an optical path difference equal to an integer number of the wavelength. The contrast was mathematically modeled based on the simulation described hereinabove.

Figure 33:
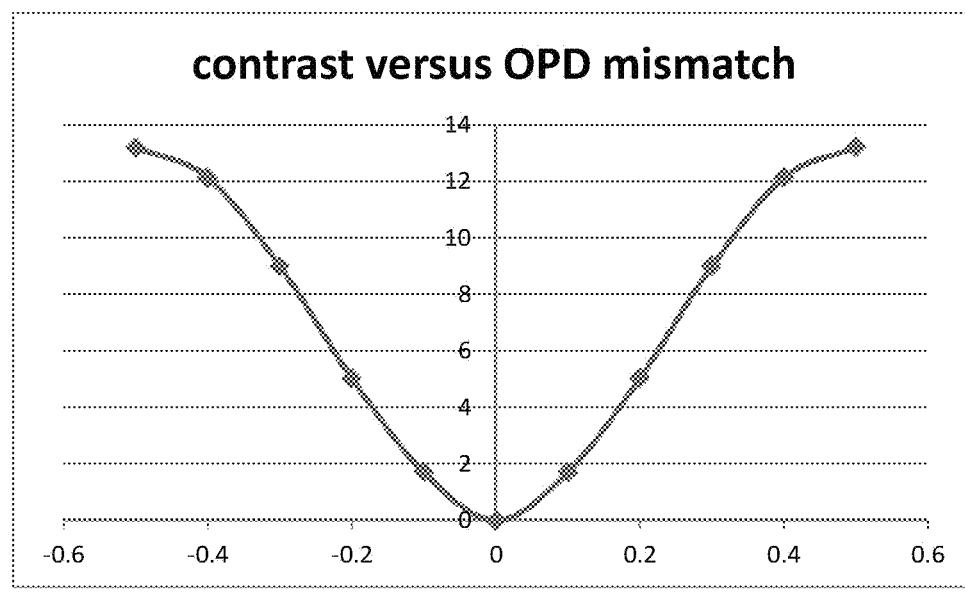
FIG. 33 graphically depicts the contrast (y-axis) as a function of optical path difference mismatch (x-axis) for an image artifact.

Referring to FIG. 33, the contrast (y-axis) fluctuates with ΔOPD (x-axis) for a fixed value of dz. Specifically, the contrast decreases to zero when ΔOPD is zero which indicates that no image artifacts would be visible in the resultant image. However, the contrast increases from zero as ΔOPD increases and the contrast reaches a maximum when ΔOPD is equal to 0.5λ, indicating that the image artifacts would be most pronounced when the mismatch between the optical pathways is on the order of half a wavelength. The contrast varies as function of the optical path difference mismatch and is minimized at integer multiples of the wavelength and maximized at half-integer multiples of the wavelength indicating that the offset spacing should be determined at integer multiples of the wavelength in order to minimize image artifacts.

Figure 34:
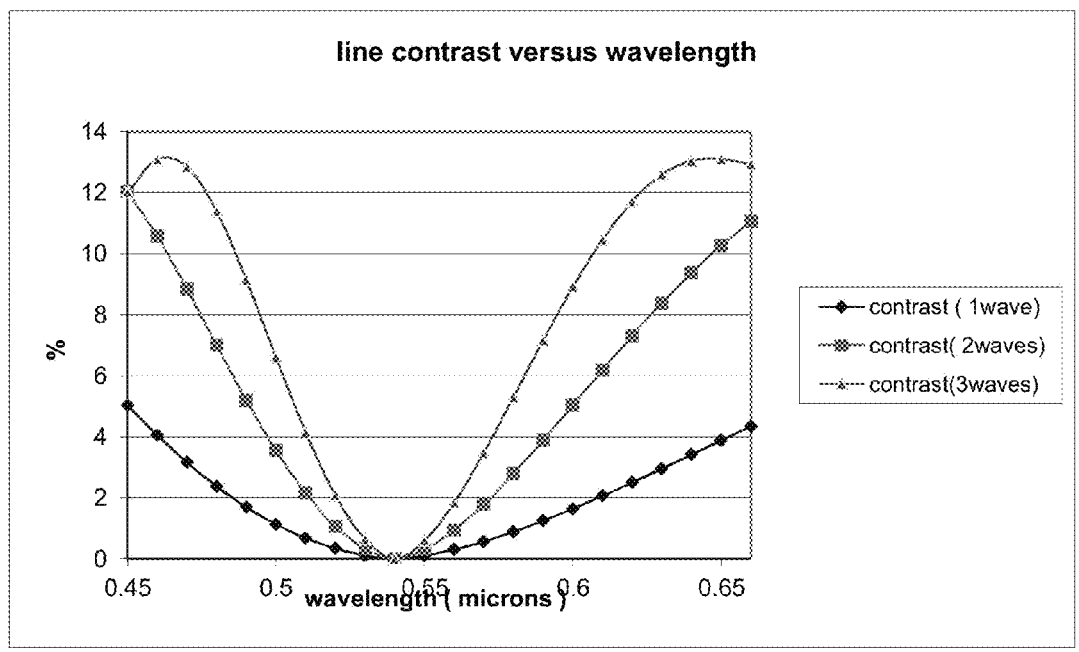
FIG. 34 graphically depicts the contrast (y-axis) as a function of wavelength for an image artifact.

While FIG. 33 demonstrates the variance in contrast as a function of ΔOPD, FIG. 34 graphically depicts the contrast (y-axis) as a function of wavelength (x-axis) for a fixed value of dz where dz has been optimized for wavelengths of green light (i.e., λ=540 nm). Green light is selected for the optimization because, in a standard display device utilizing red, green and blue pixels, the wavelength of light emitted by the green pixels is in the middle of the spectrum emitted by the array of red, green and blue pixels. Also, because the human eye is most sensitive to wavelengths of green light, it is usually best to eliminate image artifacts in that color. While the aforementioned simulations indicate that image artifacts can be eliminated for a specific wavelength by controlling the offset spacing dz, it is important to consider that actual displays emit a spectrum of wavelengths. FIG. 34 shows the pixel contrast as a function of the wavelength assuming that the OPD has been set to one, two or three times the wavelength (the wavelength being fixed at 540 nm).

As shown in FIG. 34, the contrast over the entire visible spectrum is minimized when the offset spacing dz is equal to one wavelength (i.e., k=1). FIG. 34 also shows that the contrast can be minimized for wavelengths in the green spectrum (i.e., the spectrum around 540 nm) but that the contrast increases outside the green spectrum (i.e., in the red and blue spectrums).

Accordingly, in one embodiment described herein, the offset spacing dz of the array of prisms is set to equal a one wave modulation (i.e., k=1) at a wavelength of 540 nm. Assuming the film of polymeric material has an index of refraction of approximately 1.5, the corresponding offset spacing dz is 1.08 μm (i.e., OPD=(n−1)dz=kλ, dz=kλ/(n−1)=(540 nm)/(1.5−1)).

Figure 35:
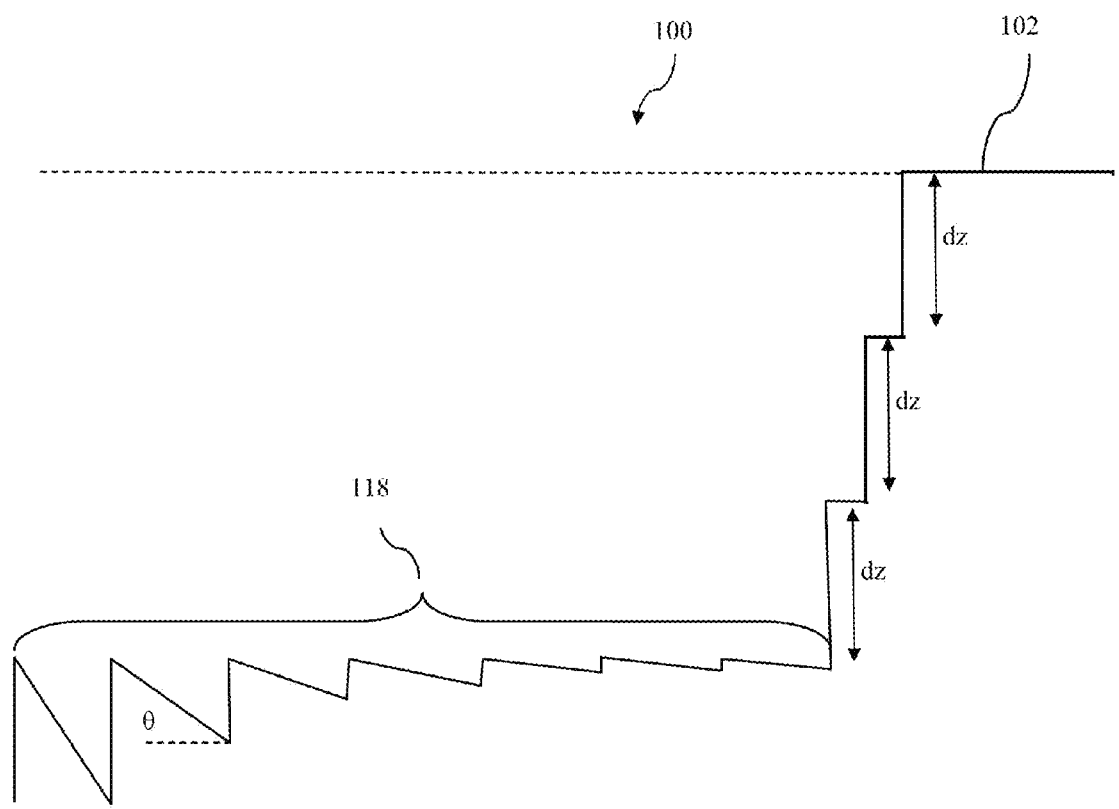
FIG. 35 schematically depicts an alternative embodiment of an array of prisms formed in the surface of a film of transparent polymeric material with an offset.

While an offset spacing dz of approximately 1 μm may minimize the occurrence of image artifacts, this offset spacing may be insufficient for purposes of forming the array of prisms in the film of polymeric material. Accordingly, in some embodiments, the array of prisms or structure may be formed in the film of polymeric material by using a series of step features with each step feature having an offset spacing dz of 1.08 μm relative to a preceding step, as schematically depicted in FIG. 35.

Figure 36:
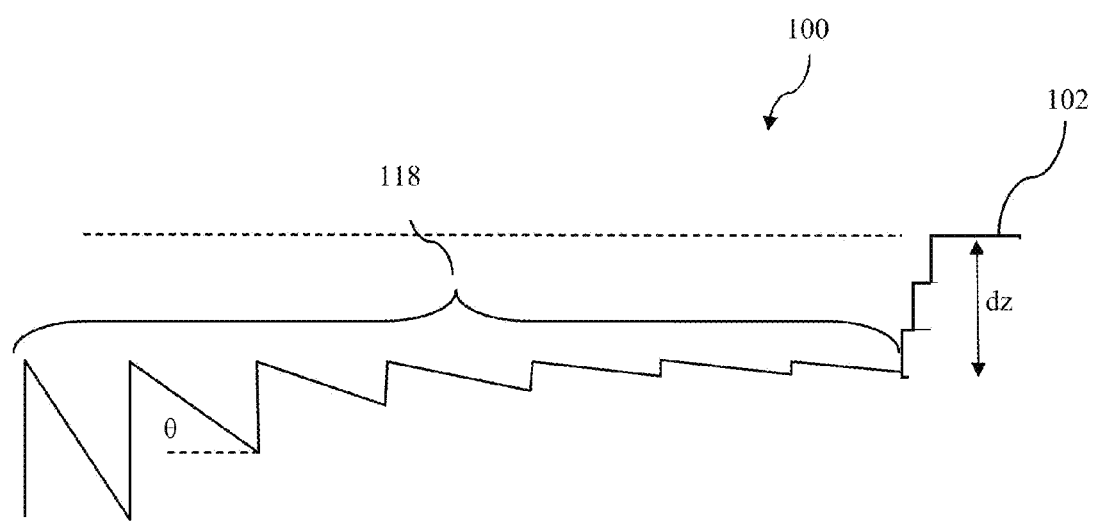
FIG. 36 schematically depicts another alternative embodiment of an array of prisms formed in the surface of a film of transparent polymeric material with an offset.

Referring now to FIG. 36, in an alternative embodiment, the desired overall offset spacing dz of the array of prisms 118 may be obtained using a series of smaller steps with each step having a step height dz' which corresponds to an OPD equal to one wave and the sum of dz' equals dz which is the amplitude by which the pattern should be offset in the material to eliminate image artifacts.

In the embodiments described herein, the offset spacing dz has a tolerance of ±0.2 μm. For example, FIG. 37 graphically depicts the effect on contrast when the offset spacing dz is adjusted by one tenth of a wavelength. Specifically, FIG. 37 shows that changing the offset spacing dz by one tenth of a wavelength shifts the contrast curve which, in turn, causes the resultant image artifact to be more visible in either the red or blue portions of the spectrum, depending on the sign of the shift.

Figure 37:
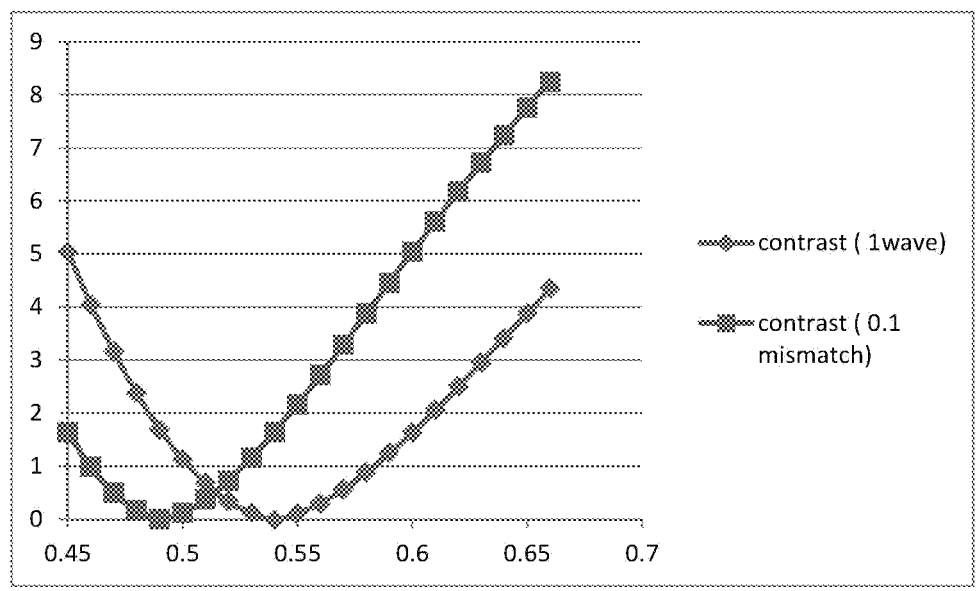
FIG. 37 graphically depicts the contrast (y-axis) as a function of wavelength (x-axis) to illustrate the shift in contrast with a change in wavelength'

Based on the simulated data depicted in FIG. 37, it has been determined that the offset spacing dz of the array of prisms should be within ±0.2 μm of the selected value in order to minimize the appearance of image artifacts in adjacent portions of the spectrum. For example, when the offset spacing is selected to be 1.08 μm, as described above, the actual offset spacing should be maintained between 0.88 μm and 1.28 μm in order to minimize the occurrence of image artifacts. This assumes that the array of prisms is formed in a film of polymer material which has an index of refraction of 1.5.

While FIGS. 31 and 35-36 depict one embodiment in which the array of prisms 118 is offset from the surface 102 of the film 100 by a step feature or a plurality of step features, it should be understood that other embodiments may be possible.

Figure 38:
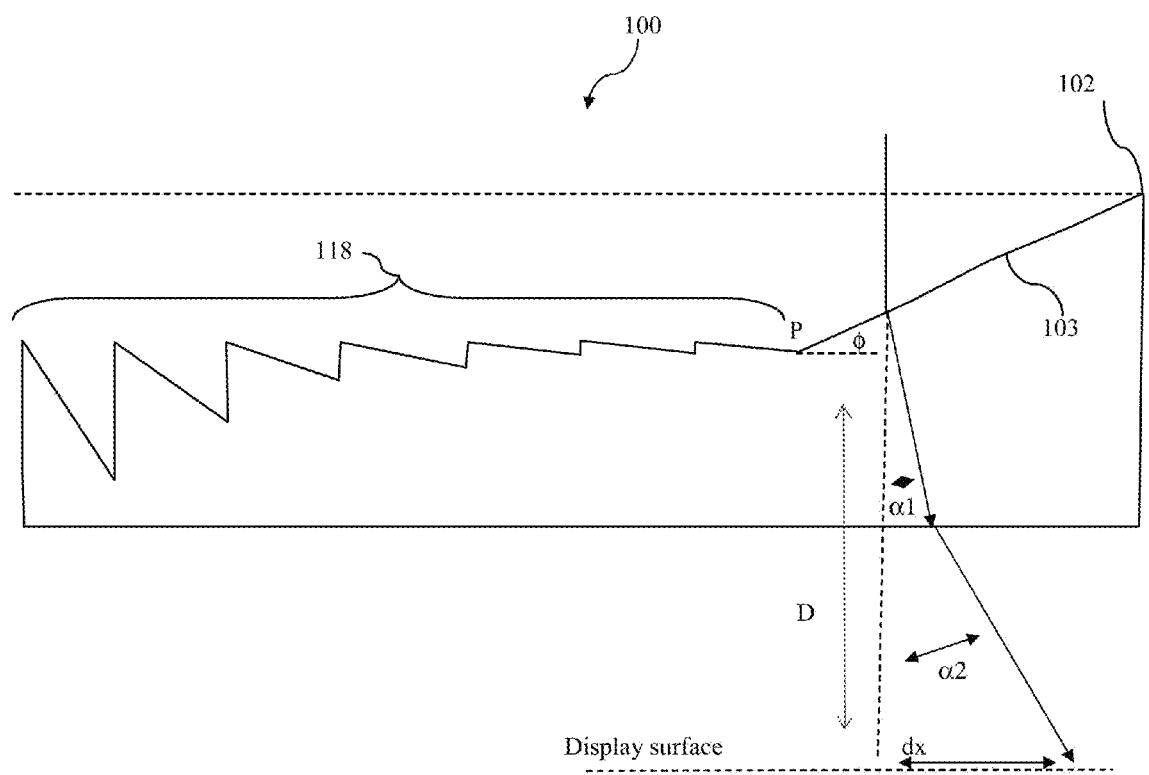
FIG. 38 schematically depicts another alternative embodiment of an array of prisms formed in the surface of a film of transparent polymeric material with an offset.

For example, FIG. 38 schematically depicts an array of prisms 118 formed in a transparent film 100 of polymeric material such that the array of prisms 118 is offset from the surface 102 of the film 100 into the thickness of the film. In this embodiment, the array of prisms 118 or the structure is offset from the surface 102 of the film by forming a graded portion 103 between the array of prisms 118 and the surface 102 of the film. The graded portion 103 is oriented at an angle φ with respect to the surface 102 such that the surface 102 transitions into the array of prisms 118 over a distance. When light hits that surface coming from normal incidence, it is deviated by an angle α1 such that sin(φ)=n sin(α1) where n is the index of refraction of the film. Also, when the light emerges from the transparent film, the final deviation angle is equal to α2 such that sin(α2)=n sin(α1). Assuming the film is placed at a distance D from the display, the effect of the prism 118 will be to displace the line of vision by an amount dx=D*tan (α2)

While this embodiment improves the manufacturability of the array of prisms 118 in the film 100, some image artifacts may be created due to the angular orientation of the graded portion 103. Specifically, the graded surface causes light from the display to be diffracted by a certain amount dx shown in FIG. 38. For example, suppose dx is ⅓ of a pixel (i.e., dx is equal to the width of a red, green, or blue sub pixel). Light rays that contact the film in the array of prisms 118 will create an image of RGB-RGB-RGB subpixels. However, light incident on the film 100 in the graded portion 103 will be diffracted by one third of a pixel thus creating an image in which one of the colors is missing. For example, the resultant pixel sequence may be RGB-GB-RGB. The missing color (in this case red) results in a colored line to appear in the image creating a readily observable image artifact.

However, the aforementioned image artifacts can be avoided by minimizing the angle φ which, in turn, reduces the value of dx. For example, it is hypothesized that setting the angle φ of the graded portion 103 such that dx is less than 1/10$^{th}$ the pixel size will significantly reduce or even mitigate the occurrence of image artifacts. Alternatively, the angle φ of the graded portion 103 can be set such that dx is equal to the width of one pixel. In this embodiment, one column of the resultant image will be missing which will be less visible than a colored line in the image.

In the embodiments described herein, the array of prisms may be formed in the film of polymeric material by first wrapping the film around a drum. The drum is then rotated and a large radius diamond tool is utilized to rectify the surface of the film. Thereafter, a diamond tool with a smaller radius is brought into close proximity of the surface of the film without touching. This may be accomplished with a vision system. Thereafter, the diamond tool may be advanced towards the surface of the film in small increments (i.e., increments of less than 0.2 μm) until a groove appears on the film. The corresponding depth is indexed as the zero depth. The desired pattern is then machined into the film by traversing the diamond tool over the surface of the film as the depth of the diamond tool is adjusted by computer control.

Referring again to FIG. 2, in the embodiments described herein, the transparent film with the array of prisms is generally applied only proximate the edges of the display cover 16 in order to avoid image degradation in the central portion of the display. However, the interior edge of the film (i.e., the edge closest to the center of the display cover 16) presents a step discontinuity which diffracts light thereby creating an image artifact. In other words, when microstructures need to be located only on a limited portion of a display, it may be of some interest to fabricate films of small size that only cover a portion of the image. In that case, the physical end of the film is what creates the step function in the optical path and the solutions described above may not be suitable to eliminate the image artifact created by the end of the film.

Figures 39, 40:
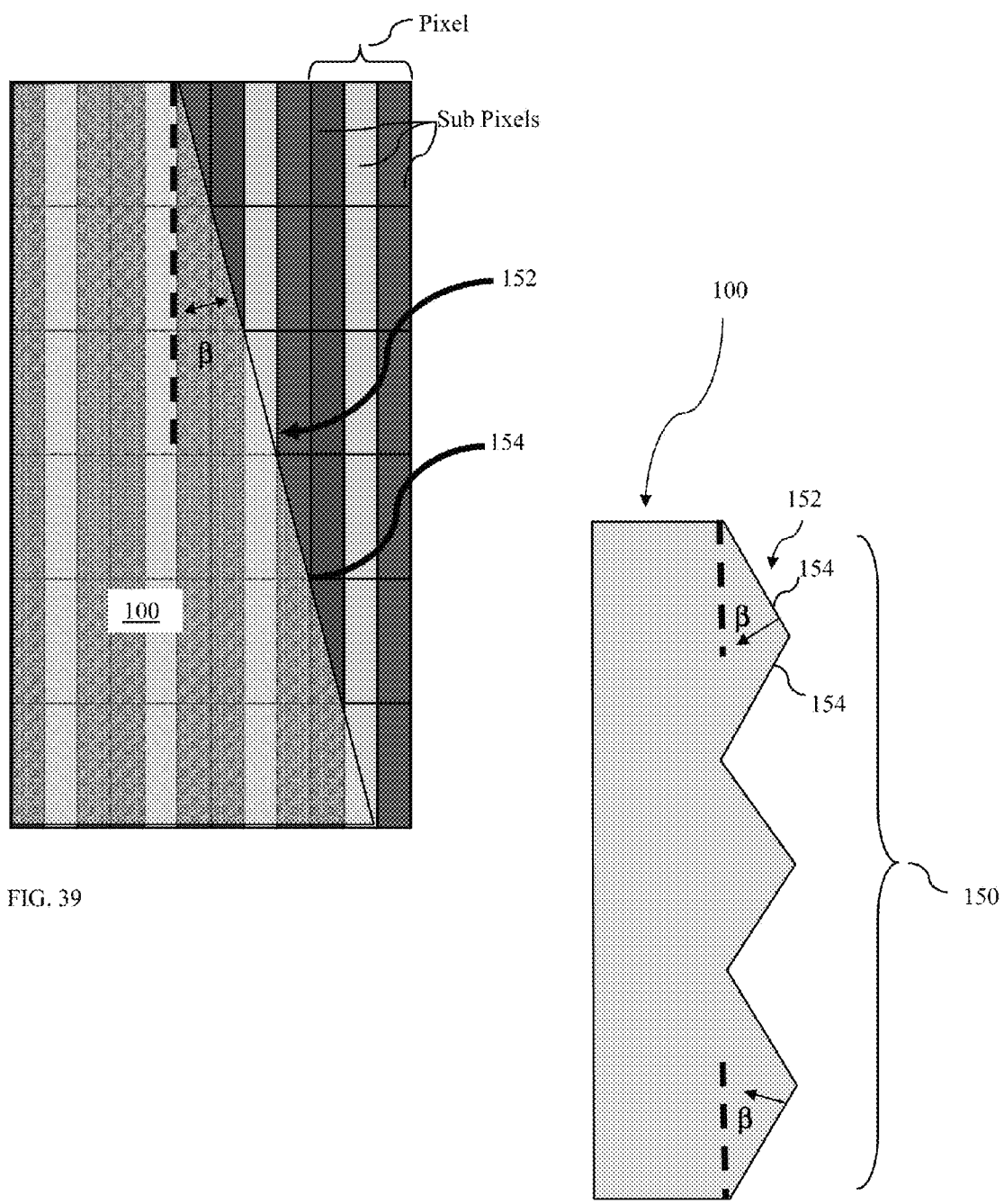
FIG. 39 schematically depicts a portion of a saw tooth pattern on the edge of a film overlayed on an array of pixels.
FIG. 40 schematically depicts a film with a saw tooth pattern on the edge of the film.

Referring now to FIGS. 39 and 40, the image artifacts created by the interior edge of the film 100 can be mitigated by forming a saw tooth pattern in the edge of the film as depicted in FIG. 40 and aligning the film 100 such that the edge of each tooth in the pattern is parallel with the diagonals of the sub pixels. As described hereinabove with respect to FIG. 32, a step feature which has an offset spacing dz which corresponds to other than an integer multiple of the selected wavelength will result in the attenuation of the light from some of the sub pixel columns in the pixel array, thereby giving the visual impression of a colored line across the entire image. Forming the edge of the film 100 into a saw tooth pattern 150 can mitigate such image artifacts. Specifically, the saw tooth pattern 150 is cut such that the edge 154 of each tooth 152 in the saw tooth pattern 150 is generally parallel to the diagonal of each sub pixel in the display. Considering a sub pixel duty factor of ⅓ (i.e., there are three sub pixels per each pixel), the angle β of the diagonal (and therefore the angle β of each "tooth" of the saw tooth pattern) relative to the long side of each sub pixel is arctan(⅓)≈18 degrees. Accordingly, the edge of the film 100 should be cut such that the angle of each tooth 152 of the saw tooth pattern 150 relative to the long side of each sub pixel is approximately 18 degrees, as shown in FIG. 40. When the film 100 is cut and oriented such that the edges of the saw tooth pattern are aligned with the diagonals of the sub pixels, as described herein and schematically depicted in FIG. 39, the resulting diffraction of light at the edge of the film alternately effects red, green, and blue sub pixels of different pixels and, as such, eliminates the line image artifact and replaces it with a high spatial frequency modulation of the color which is less noticeable to the observer.

While reference has been made herein to use of the aforementioned films to facilitate the apparent elimination of a display bezel, it should be understood that other uses are contemplated. In particular, it is contemplated that the aforementioned films may be used in any application where a film is applied to less than the entire display surface of a display device.

For the purposes of describing and defining embodiments of the present disclosure it is noted that the terms "substantially," "approximately," and "about" are utilized herein to represent the inherent degree of uncertainty that may be attributed to any quantitative comparison, value, measurement, or other representation.

It is noted that recitations herein of a component of a particular embodiment being "configured" in a particular way, or to embody a particular property, or function in a particular manner, are structural recitations as opposed to recitations of intended use. More specifically, the references herein to the manner in which a component is "configured" denotes an existing physical condition of the component and, as such, is to be taken as a definite recitation of the structural characteristics of the component.

It is also noted that the use of the phrase "at least one" in describing a particular component or element does not imply that the use of the term "a" in describing other components or elements excludes the use of more than one for the particular component or element. More specifically, although a component may be described using "a," it is not to be interpreted as limiting the component to only one.

While particular embodiments have been illustrated and described herein, it should be understood that various other changes and modifications may be made without departing from the spirit and scope of the claimed subject matter. More specifically, although some aspects of the embodiments described are identified herein as preferred or particularly advantageous, it is contemplated that the claimed subject matter is not necessarily limited to these preferred aspects.

The invention claimed is:

1. A display cover for coupling to a display device, the display cover comprising:
a perimeter portion comprising a first surface and a second surface; and
a film of polymeric material attached to at least one of the first surface or the second surface of the perimeter portion, the film comprising a central surface portion, an offset portion, and a peripheral portion, wherein the offset portion extends from the central surface portion, wherein the peripheral portion extends from the offset portion, wherein the peripheral portion includes a first array of prisms extending from an edge of the perimeter portion to a distance L, wherein the first array of prisms is offset from and positioned below the central surface portion of the film by an offset spacing dz, wherein the first array of prisms is offset from the central surface portion of the film by at least one step feature, and wherein the offset spacing dz is equal to $(k*\lambda(n-1))\pm 0.2$ μm, where $\lambda=540$ nm, k is an integer greater than or equal to 1, and n is an index of refraction of the film.

2. The display cover of claim 1, wherein the first array of prisms is offset from the surface of the film by a single step feature having a step height equal to the offset spacing dz.

3. The display cover of claim 2, wherein the single step feature is positioned at an angle of 90 degrees with respect to the central surface portion of the film.

4. The display cover of claim 1, wherein the first array of prisms is offset from the central surface portion of the film by a plurality of step features and a sum of a step height of individual ones of the plurality of step features is equal to dz.

5. The display cover of claim 1, wherein k=1, and n≈1.5.

6. The display cover of claim 1, wherein the first array of prisms is offset from and positioned below the central surface portion of the film by a graded portion that is oriented at an angle φ with respect to the central surface portion such that the central surface portion transitions into the first array of prisms over a distance.

7. A film of polymeric material comprising a central surface portion having a peripheral end, a graded portion having a central end and a peripheral end, and a peripheral portion, wherein the central end of the graded portion extends from the peripheral end of the central surface portion at an acute angle φ relative to the central surface portion, wherein the peripheral portion extends from the peripheral end of the graded portion, wherein the peripheral portion includes a first array of prisms offset from and positioned below the central surface portion of the film by the graded portion by an offset spacing dz, wherein the graded portion is oriented at the acute angle φ with respect to the central surface portion such that the surface transitions into the first array of prisms over a distance.

8. The film of claim 7, wherein when the film is coupled to a display device, the angle φ is such that light passing through the graded portion of the film is offset by an amount dx which is equal to one pixel size of the display device.

9. The display cover of claim 1, wherein:
each prism of the first array of prisms has a prism angle θ;
the first array of prisms is configured to shift a portion of an image produced by the display panel; and
the display cover comprises a central region bounded by the perimeter portion, wherein the first array of prisms is not present at the central region.

10. The display cover of claim 1, wherein the film of polymeric material has at least one edge having a saw tooth pattern formed therein.

11. The display cover of claim 10, wherein the film is aligned on the display cover such that an edge of each tooth of the saw tooth pattern is parallel with a diagonal of at least one corresponding sub pixel in the display device.

12. The display cover of claim 10, wherein edges of the saw tooth pattern have a tooth angle which is equal to arctan (SDP), where SDP is a sub-duty pixel factor of the display device.

13. The display cover of claim 12, wherein the SDP=⅓.

14. A film of polymeric material comprising a central surface portion, a plurality of step features, and a peripheral portion, wherein the plurality of step features is disposed between the central surface portion and the peripheral portion, wherein a first step feature of the plurality of step features is orthogonal to the central surface portion of the film, wherein a second step feature of the plurality of step features is orthogonal to the central surface portion of the film, and wherein the second step feature is offset from and positioned below the first step feature, and wherein the peripheral portion includes a first array of prisms offset from and positioned below the central surface portion of the film by the plurality of step features by an offset spacing dz.

15. The film of claim 14, wherein at least one step feature of the plurality of step features is a step feature that is positioned at an angle of 90 degrees with respect to the central surface portion of the film.

16. The film of claim 14, wherein a sum of a step height of individual ones of the plurality of step features is equal to dz.

17. The film of claim 14, wherein the offset spacing dz is equal to $(k*\lambda(n-1))\pm 0.2$ μm, where λ is a median wavelength of light transmitted through the film, k is an integer greater than or equal to 1, and n is an index of refraction of the film.

18. The film of claim 17, wherein $\lambda=540$ nm, $k=1$, and $n\approx1.5$.

19. The film of claim 7, wherein when the film is coupled to a display device, the angle $\phi$ is such that light passing through the graded portion of the film is offset by an amount dx which is less than 1/10 of a pixel size of the display device.

20. The film of claim 7, wherein a maximum height of the first array of prisms is offset from and positioned below a plane that intersects a midpoint of the graded portion and that extends parallel to the central surface portion.

* * * * *